United States Patent
Piemonte et al.

(10) Patent No.: US 9,147,286 B2
(45) Date of Patent: Sep. 29, 2015

(54) NON-STATIC 3D MAP VIEWS

(71) Applicant: Apple Inc., Cupertino, CA (US)

(72) Inventors: Patrick S. Piemonte, San Francisco, CA (US); Erik Anders Mikael Adlers, Cupertino, CA (US); Christopher Blumenberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 166 days.

(21) Appl. No.: 13/783,201

(22) Filed: Mar. 1, 2013

(65) Prior Publication Data

US 2013/0328871 A1  Dec. 12, 2013

Related U.S. Application Data

(60) Provisional application No. 61/656,032, filed on Jun. 6, 2012, provisional application No. 61/656,043, filed on Jun. 6, 2012.

(51) Int. Cl.
| | |
|---|---|
| G06T 15/00 | (2011.01) |
| G06T 17/05 | (2011.01) |
| G01C 21/36 | (2006.01) |
| G06T 13/00 | (2011.01) |

(52) U.S. Cl.
CPC ............ *G06T 17/05* (2013.01); *G01C 21/3638* (2013.01); *G06T 13/00* (2013.01)

(58) Field of Classification Search
CPC ..... G01C 21/3638; G06T 17/05; G06T 13/00
USPC .................. 345/419, 581, 582; 382/113, 154; 701/533
See application file for complete search history.

(56) References Cited

U.S. PATENT DOCUMENTS

| | | |
|---|---|---|
| 5,717,848 A | 2/1998 | Watanabe et al. |
| 6,163,269 A | 12/2000 | Millington et al. |
| 6,496,189 B1 | 12/2002 | Yaron et al. |
| 7,551,172 B2 | 6/2009 | Yaron et al. |
| 7,746,343 B1 | 6/2010 | Charaniya et al. |
| 8,237,713 B2 | 8/2012 | Yaron et al. |

(Continued)

FOREIGN PATENT DOCUMENTS

| | | |
|---|---|---|
| DE | 102007030226 | 1/2009 |
| EP | 1788541 | 5/2007 |
| EP | 2194508 | 6/2010 |
| JP | H09-292830 | 11/1997 |
| WO | 2005/103624 | 11/2005 |
| WO | WO 2008/056880 | 5/2008 |
| WO | WO 2013/184534 | 12/2013 |

OTHER PUBLICATIONS

Agrawal, Anupam, et al., "Geometry-based Mapping and Rendering of Vector Data over LOD Phototextured 3D Terrain Models," Short Communications proceedings, WSCG '2006, Jan. 30-Feb. 3, 2006, 8 pages, UNION Agency—Science Press, Plzen, Czech Republic.

(Continued)

*Primary Examiner* — Phu K Nguyen
(74) *Attorney, Agent, or Firm* — Adeli LLP

(57) ABSTRACT

Some embodiments provide a mapping application for generating views of a three-dimensional (3D) map. The mapping application includes a geographic data module for identifying a set of geographic data that represents a portion of the 3D map. The set of geographic data includes a set of camera captured images that correspond to the portion of the 3D map. The mapping application includes an image processing module for rendering the view of the 3D map based on the geographic data by animating a type of map element in the view of the 3D map.

23 Claims, 17 Drawing Sheets

(56) References Cited

U.S. PATENT DOCUMENTS

| | | | |
|---|---|---|---|
| 8,774,470 B1 * | 7/2014 | Schmidt et al. | 382/113 |
| 8,880,345 B2 * | 11/2014 | Kazama et al. | 701/533 |
| 8,890,863 B1 * | 11/2014 | Lininger | 345/419 |
| 2001/0028350 A1 | 10/2001 | Matsuoka et al. | |
| 2003/0137515 A1 | 7/2003 | Cederwall et al. | |
| 2004/0176908 A1 | 9/2004 | Senda et al. | |
| 2004/0236507 A1 | 11/2004 | Maruyama et al. | |
| 2006/0015249 A1 | 1/2006 | Gieseke | |
| 2006/0247845 A1 | 11/2006 | Cera et al. | |
| 2007/0195089 A1 | 8/2007 | Furukado | |
| 2008/0016145 A1 | 1/2008 | Takase et al. | |
| 2008/0198158 A1 | 8/2008 | Iwamura et al. | |
| 2009/0273601 A1 | 11/2009 | Kim | |
| 2010/0045704 A1 | 2/2010 | Kim | |
| 2010/0074538 A1 | 3/2010 | Mishra et al. | |
| 2011/0130949 A1 | 6/2011 | Arrasvuori | |
| 2012/0314040 A1 | 12/2012 | Kopf et al. | |

OTHER PUBLICATIONS

Nurminen, Antti, et al., "10 Designing Interactions for Navigation in 3D Mobile Maps," Map-Based Mobile Services, Aug. 6, 2008, 31 pages, Springer, Berlin Heidelberg.

Harrower, Mark, "A Look at the History and Future of Animated Maps", Cartographica, Sep. 1, 2004, pp. 33-42, vol. 39, No. 3, University of Toronto Press, Canada.

International Search Report and Written Opinion for PCT/US2013/043803, Nov. 22, 2013 (mailing date), Apple Inc.

Author Unknown, "The Next Generation of Mobile Maps," available at http://googleblog.blogspot.com/2010/12/next-generation-of-mobile-maps.html, Dec. 16, 2010, 5 pages.

* cited by examiner

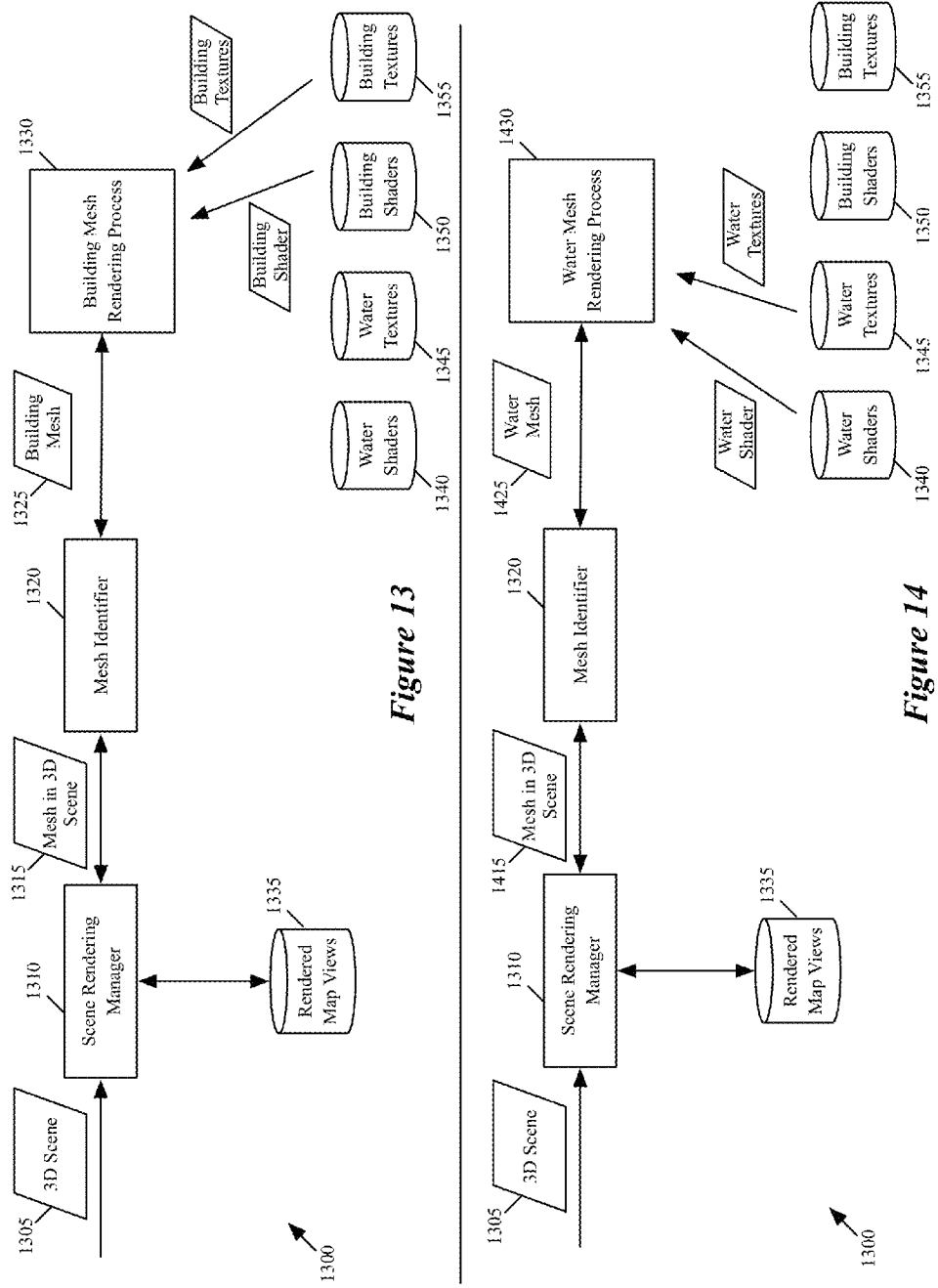

NON-STATIC 3D MAP VIEWS

CLAIM OF BENEFIT TO PRIOR APPLICATIONS

This application claims the benefit of U.S. Provisional Patent Application 61/656,032, filed Jun. 6, 2012; and U.S. Provisional Patent Application 61/656,043, filed Jun. 6, 2012. Provisional Patent Applications 61/656,032 and 61/656,043 are hereby incorporated by reference.

BACKGROUND

Many map-based applications are available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes the relative location of streets, highways, points of interest, etc. in the map.

Some map-based applications provide different types of views of the map and allow users to select a type of view for the application to use to display the map. Examples of such types of views include a map view, a satellite view, a hybrid view, etc. For some or all of the different types of views of the map, a number of map-based applications provide a two-dimensional (2D) viewing mode, a three-dimensional (3D) viewing mode, or both viewing modes.

BRIEF SUMMARY

Some embodiments of the invention provide a novel mapping application that animates three-dimensional (3D) views of a map when the mapping application renders the 3D views while in a satellite viewing mode. In some embodiments, the mapping application renders the 3D views of the map using camera captured images (CCIs) when the mapping application is in the satellite viewing mode.

The mapping application of some embodiments animates different defined types of map elements and/or constructs (e.g., bodies of water, shorelines, buildings, foliage, etc.) in the 3D view of the map. The mapping application of some embodiments animates some or all of the different defined types of map elements and/or constructs differently. For instance, in some embodiments, the mapping application animates bodies of water and buildings differently by using different shaders for rendering the bodies of water and the buildings.

In some embodiments, the mapping application animates the defined types of map elements and/or constructs differently based on different types of input (e.g., touch input, gesture input, audio input, motion input, etc.) received at a device on which the mapping application is operating. For example, the mapping application of some embodiments animates bodies of water based on touch input differently than when the mapping application animates the bodies of water based on audio input, motion input, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 13 conceptually illustrates a rendering engine that renders buildings for animated 3D satellite map views according to some embodiments of the invention.

FIG. 14 conceptually illustrates the rendering engine illustrated in FIG. 13 that renders water for animated 3D satellite map views according to some embodiments of the invention.

DETAILED DESCRIPTION

In the following detailed description of the invention, numerous details, examples, and embodiments of the invention are set forth and described. However, it will be clear and apparent to one of ordinary skill in the art that the invention is not limited to the embodiments set forth and that the invention may be practiced without some of the specific details and examples discussed.

Some embodiments of the invention provide a novel mapping application that animates three-dimensional (3D) views of a map when the mapping application renders the 3D views while in a satellite viewing mode. In some embodiments, the mapping application renders the 3D views of the map using CCIs when the mapping application is in the satellite viewing mode.

The mapping application of some embodiments animates different defined types of map elements and/or constructs (e.g., bodies of water, shorelines, buildings, foliage, etc.) in the 3D view of the map. The mapping application of some embodiments animates some or all of the different defined types of map elements and/or constructs differently. For instance, in some embodiments, the mapping application animates bodies of water and buildings differently by using different shaders for rendering the bodies of water and the buildings.

Figure 1:
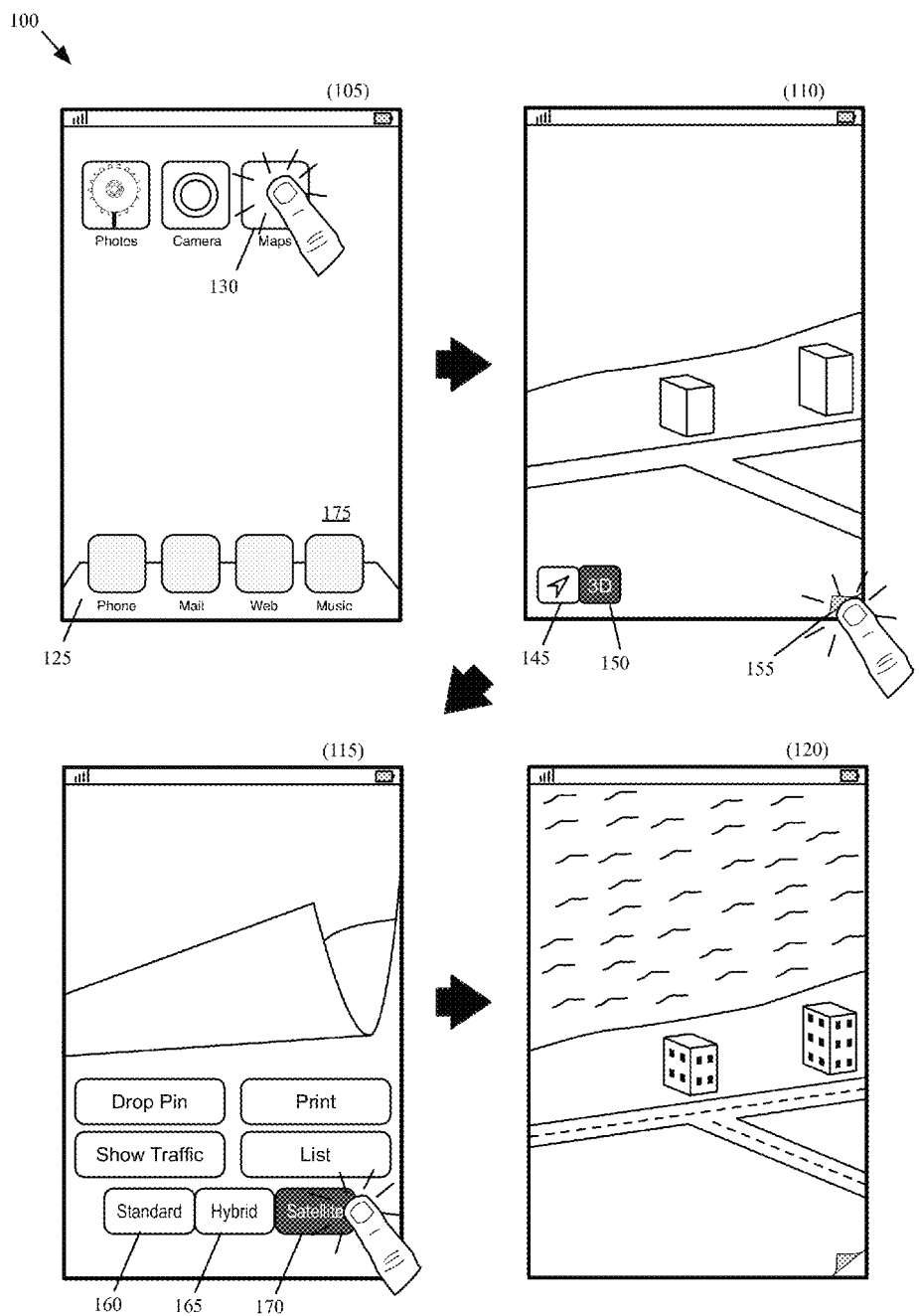
FIG. 1 conceptually illustrates a device that executes a mapping application of some embodiments that provides animated 3D satellite map views.

FIG. 1 conceptually illustrates a device 100 that executes a mapping application of some embodiments that provides an animated 3D satellite map view feature. Specifically, FIG. 1 illustrates four different stages 105-120 of interaction with the mapping application.

The first stage 105 shows the device 100's graphical user interface (GUI) 175, which includes several selectable user interface (UI) items (e.g., icons) of several applications in a dock area 125 and on a page of the GUI 175. One of the selectable UI items displayed on the page at this stage 105 is a selectable UI item 130 for invoking the mapping application. As illustrated in the first stage 105, a user is selecting the UI item 130 through touch contact with the device's display screen at the location of UI item 130 in order to open the mapping application.

The second stage 110 shows the device 100 after the mapping application has opened. As shown in this stage, the mapping application is displaying a view of a map (also referred to as a map view) that includes two intersecting roads, two buildings, and a body of water behind the roads and buildings. The mapping application is also displaying a set of floating controls. In this example, the mapping application starts in a "Standard" viewing mode, which is described below.

As shown, the set of floating controls include a position control 145, a 3D control 150, and a page curl control 155. The position control 145 is for transitioning to a map view that includes the current position of the device 100. For instance, when the position control 145 is selected, the mapping application of some embodiments transitions to a map view in which the current position of the device 100 is located approximately in the center of the map view (e.g., the center of a display screen of the device 100). In some embodiments, the mapping application maintains such a map view as the device 100 is moving. The mapping application of some embodiments also identifies the direction to which the device 100 currently points. In some embodiments, the mapping application identifies the location of the device 100 using global positioning system (GPS) signals that the device 100 receives from GPS satellites. Alternatively or conjunctively, the mapping application uses other methods (e.g., cell tower triangulation) to compute the current location of the device 100.

The 3D control 150 is a control for enabling and disabling a feature that allows for browsing a map or a route along the map in three dimensions (3D). In some embodiments, the mapping application provides the 3D control 150 in order to quickly switch between a two-dimensional (2D) view of the map and a 3D view of the map. The 3D control 150 also serves as (1) an indicator that the current view of the map is a 3D view, and (2) an indicator that a 3D perspective is available for a given map view (e.g., a 3D view might not be available when the map view is zoomed out past a defined threshold zoom level). In some embodiments, the mapping application provides different appearances of the 3D control 150 that correspond to some of these indications. For instance, in some embodiments, the mapping application presents the "3D" in the 3D control 150 as appearing grey when the 3D view of the map is unavailable, appearing black when the 3D view is available but the map is in the 2D view, and appearing blue when the map is in the 3D view. The mapping application of some embodiments presents a fourth appearance (e.g., a building image or shape instead of the "3D" characters) of the 3D control 150 when the mapping application is in a satellite viewing mode and a 3D view of the map is available (e.g., when the zoom level of the map view is greater than a defined threshold zoom level). As shown in the second stage 110, 3D feature is enabled (e.g., by selecting the 3D control 150), as indicated in this example by a highlighting of the 3D control 150. As such, the mapping application is presenting a 3D view of a map.

The page curl control 155 is a control that allows the application to minimize the number of on-screen controls, by placing certain less frequently used options in a secondary UI screen, which is accessible through a selection of the page curl control 155. In this manner, the page curl control 155 allows the mapping application to display more of the map while offering an unobtrusive way to access further functionality that is provided by the other set of controls.

In some embodiments, the page curl control 155 is permanently displayed on at least some of the map views that the mapping application provides. For instance, in some embodiments, the mapping application displays the page curl control 155 permanently when the mapping application is in a map-browsing mode, location-searching mode, or route-identification mode. The mapping application of some embodiments does not provide the page curl control 155 in map views where the additional functionality is deemed to be inappropriate to the task at hand. For instance, in some embodiments, the mapping application does not present the page curl control 155 while the mapping application is in a route-navigation mode.

The page curl control 155 indicates the location of another set of controls that are conceptually "behind" or "under" the current view. When the page curl control 155 is selected, the mapping application presents an animation that "peels" off the current view to display another view that shows the other set of controls. The third stage 115 illustrates the mapping application after the user selects (or selects and drags) the page curl control 155 and the mapping application presents such an animation. While FIG. 1 illustrates presenting another set of controls by selecting the page curl control 155, the mapping application of some embodiments presents the other set of controls using different techniques. For instance, in some embodiments, the mapping application presents (e.g., by sliding the other set of controls onto the display screen of the device) the other set of controls when the mapping application receives gesture input (e.g., a swipe gesture) on the device's display screen.

As shown by this stage, the mapping application presents several controls once the mapping application "peels" the page shown in the second stage 110. Among the controls that the mapping application of some embodiments presents after the selection of the page curl control 155 is a set of viewing mode controls that includes is a standard viewing mode control 160 for activating a "Standard" viewing mode, a hybrid viewing mode control 165 for activating a hybrid viewing mode, and a satellite viewing mode control 170 for activating a satellite viewing mode.

When the mapping application is in a satellite viewing mode, the mapping application of some embodiments renders map views using CCIs. In some embodiments, CCIs are images of the real world captured by real cameras operated by humans and/or machines (as opposed to a virtual camera that is used for rendering views of a 3D model). CCIs include images captured by real cameras on satellites, fly-by captured images (e.g., images captured by real cameras on airplanes, space shuttles, helicopters, balloons, and/or any other device used for aerial photography), drive-by captured images (e.g., images captured by real cameras on cars, trucks, motorcycles, buses, bicycles, trains, and/or any other type of vehicle that operates on land), etc. CCIs are referred to as real world captured images in some embodiments. The mapping application of some embodiments renders satellite map views by texture mapping CCIs to the map, map elements, and/or map constructs.

In some embodiments, a map service generates 3D model of a map that represents the real world based on geographical data collected from the real world. Some or all of the 3D primitives (e.g., points, lines, polygons, surfaces, etc.) of the 3D model of the map include location data that maps the to the corresponding location in the real world. In some embodiments, when a capturing device (e.g., a real camera) captures CCIs, the capturing device also records the location (e.g., GPS data) and position of the capturing device.

Based on information regarding the location and position of a capturing device used to capture a particular CCI, the map service of some embodiments identifies positions in the 3D model of the map to which pixels and/or groups of pixels in the particular CCI correlate. In some embodiments, the map service then maps the particular CCI to the 3D model of the map based on the identified positions. Such mapping, in some embodiments, is referred to as texture mapping. In some embodiments, the map service manipulates (e.g., rotated, translated, scaled, etc.) the particular CCI to better align the elements in the particular CCI with corresponding elements in the 3D model of the map.

In some embodiments, the mapping application renders map views using the 3D model of the map textured with CCIs by accessing (e.g., through the Internet) the map service described above and retrieving data (e.g., stored as satellite map tiles) representing a portion of the 3D model of the map from which the mapping application renders the map views. The data includes in some embodiments polygons that represent the map elements and/or map constructs in the portion of the 3D model and the corresponding CCIs with which the mapping application texture maps to the polygons. Such rendering is referred to in some embodiments as stereographic rendering using on CCIs. In some embodiments, the mapping application renders such map views of the 3D model of the map when the mapping application is in a satellite viewing mode and rendering 3D satellite map views described in this application. Details of generating 3D maps with CCIs are described in PCT Application PCT/EP2011/054155, entitled "3D Streets." PCT Application PCT/EP2011/054155 is incorporated herein by reference.

When the mapping application is in the "Standard" viewing mode, the mapping application of some embodiments renders map views using non-CCIs (e.g., user-generated textures/images, machine-generated textures/images, etc.). In other words, the mapping application of some such embodiments renders "Standard" map views without using any CCIs.

In addition, the third stage 115 illustrates that the user is activating the satellite viewing mode. In particular, the user activates the satellite viewing mode by selecting (e.g., using a finger to tap) the satellite viewing mode control 170, as indicated by a highlighting of the satellite viewing mode control 170. When the mapping application receives the selection of the satellite viewing mode control 170, the mapping application of some embodiments transitions from rendering the map in the standard viewing mode to rendering the map in the satellite viewing mode.

The fourth stage 120 shows the mapping application displaying a map view after the satellite viewing mode is activated. As mentioned above, for the satellite viewing mode of some embodiments, CCIs are texture mapped to the map, map elements, and/or map constructs. As such, the buildings in this stage are illustrated with windows and the roads with lane markers.

In some embodiments, the animated 3D satellite map view feature of the mapping application animates different defined types of map elements and/or constructs (e.g., bodies of water, shorelines, buildings, foliage, etc.) in a map view. Different embodiments of the mapping application animate any number of different defined types of map elements. For this example, the mapping application animates map elements are that are identified as bodies of water (e.g., oceans, lakes, rivers, reservoirs, harbors, etc.) by generating (e.g., using a shader for animating still water) an animation of ripple waves in the water. The animation in the fourth stage 120 is depicted by short curved lines in the body of water that conceptually represent ripple waves in the water.

Many of the examples and embodiments described in this application show the GUI of the mapping application with the set of UI elements and controls shown in FIG. 1, a different set of UI elements and/or controls, or none at all for the purpose of explanation and simplicity. One of ordinary skill in the art will understand that the GUI of the mapping application of some embodiments may include additional and/or different UI elements and/or controls for different modalities of the mapping application (e.g., a map-browsing mode, a location-searching mode, a route-identification mode, a route-navigation mode, etc.). For instance, while in a map-browsing mode, the mapping application of some embodiments includes the UI elements and controls illustrated in FIG. 1 as well as a top bar positioned near the top of device's display screen that includes a direction control for requesting routes along the map from a starting location and an ending location, a search field for searching the location of certain map items (e.g., streets, businesses, points of interest, etc.) in the map, a bookmark control for bookmarking locations of map elements and routes, etc.

In addition, numerous examples and embodiments described in this application illustrate the mapping application in a map-browsing mode. In some embodiments, the mapping application includes several different modalities (e.g., a location-searching mode, a route-identification mode, a route-navigation mode, etc.) for interacting with the map. The application of some embodiments includes a novel user interface (UI) design that seamlessly and cohesively integrates the controls for each of its different modalities by using a minimum set of on-screen controls that floats on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

Several more detailed embodiments of the invention are described in the sections below. Section I describes details of example use cases for the animated 3D satellite map view feature according to some embodiments of the invention. Section II then describes details of image processing for the animated 3D satellite map view feature of some embodiments. Next, Section III describes example electronic systems with which some embodiments of the invention are implemented. Finally, Section IV describes a map service operating environment in which some embodiments of the invention operate.

I. Example Use Cases for Animated 3D Satellite Map Views

As discussed above, when the mapping application is in a satellite viewing mode, the mapping application of some embodiments provides a feature that animates different defined types of map elements and/or constructs in a 3D satellite map views. Alternatively or in conjunction with animating different defined types of map elements and/or constructs in a 3D satellite map views, the mapping application of some embodiments animates the defined types of map elements and/or constructs differently based on different types of input (e.g., touch input, gesture input, audio input, motion input, etc.) received at a device on which the mapping application is operating.

A. Animations of Water

Figure 2:
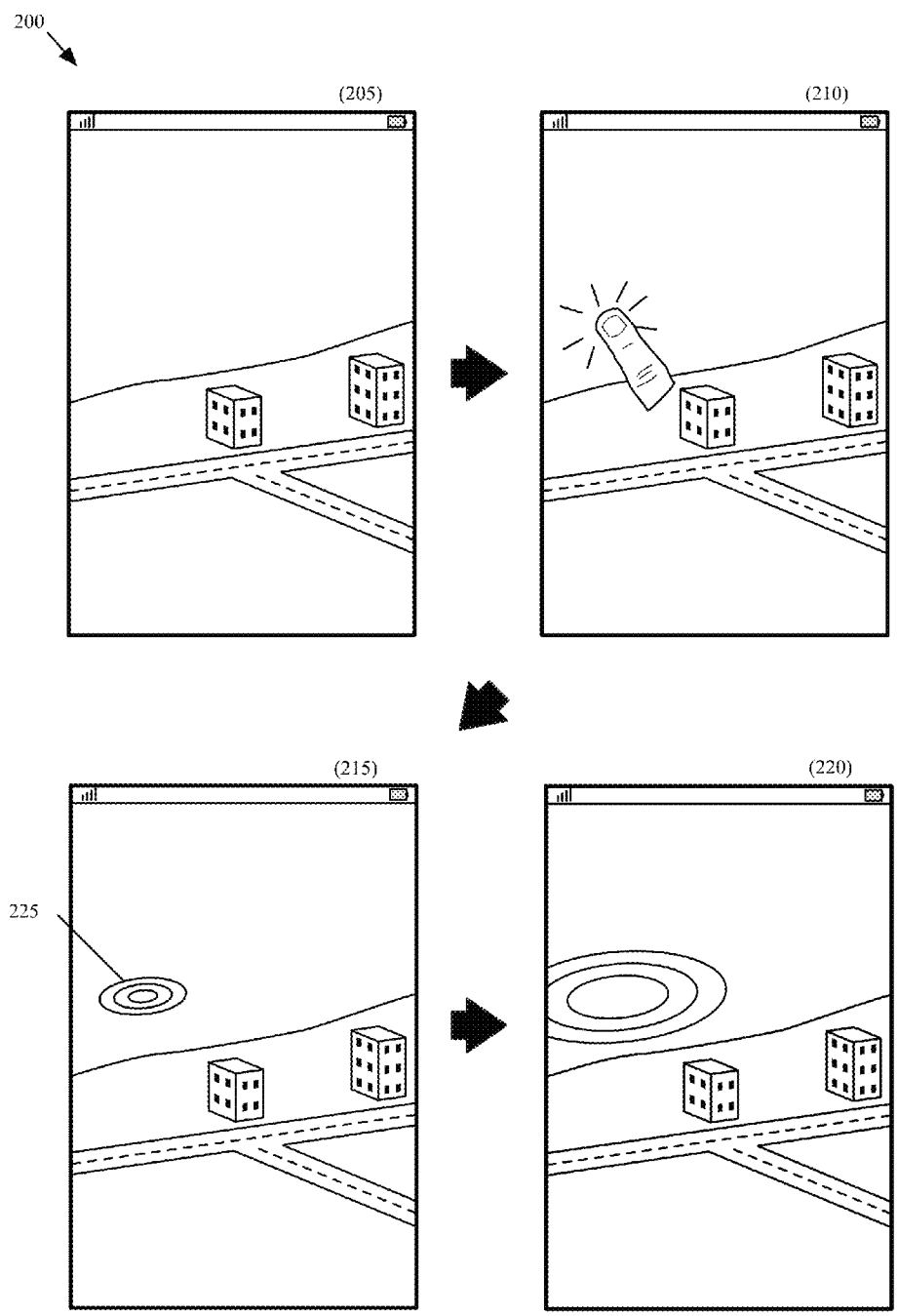
FIG. 2 conceptually illustrates an example of the mapping application of some embodiments animating water in a 3D satellite map view based on touch input.

FIG. 2 conceptually illustrates an example of the mapping application of some embodiments animating water in a 3D satellite map view based on touch input. In particular, FIG. 2 illustrates a GUI 200 of the mapping application of some embodiments at four different stages 205-220 of animating a body of water in response to touch input.

The first stage 205 is similar to the fourth stage 120 illustrated in FIG. 1 except that the animation of the body of water depicted by short curved lines in the body of water that conceptually represent ripple waves in the water is not shown for purposes of explanation and simplicity. That is, the first stage 205 of FIG. 2 illustrates a 3D satellite map view that includes two intersecting roads, two buildings, and a body of water behind the roads and buildings.

The second stage 210 illustrates a user selecting a location on the body of water. In this example, the user selects the location of the body of water by using a finger to tap a touchscreen of the device on which the mapping application is operating.

The third stage 215 illustrates the GUI 200 after the user selects the location of the body of water. When the mapping application receives the selection of the body of water, the mapping application for this example generates (e.g., using a shader for animating water ripples) an animation of water ripples that originate at or near the location of the body of water selected by the user. As shown, several water ripples 225 are shown at or near the location of the body of water selected by the user in the second stage 210.

The fourth stage 220 illustrates of a progression of the animation of the water ripples shown in the third stage 215. For this example, the mapping application continues to animate the water ripples illustrated in the third stage 215 by animating the water ripples so that the water ripples have propagated away from the location of the body of water selected by the user.

While FIG. 2 illustrates an example of animating water in a 3D satellite map view based on a single touch input, one of ordinary skill in the art will realize that the mapping application of some embodiments generates animations of water ripple effects for multiple touch inputs. In addition, in some embodiments, the mapping application generates animations of water ripple effects and/or other effects based on different types of touch input. For instance, a user may use a finger to touch and hold the water while using another finger to touch and move through the water to create water ripple effects and/or wave effects in the water.

Figure 3:
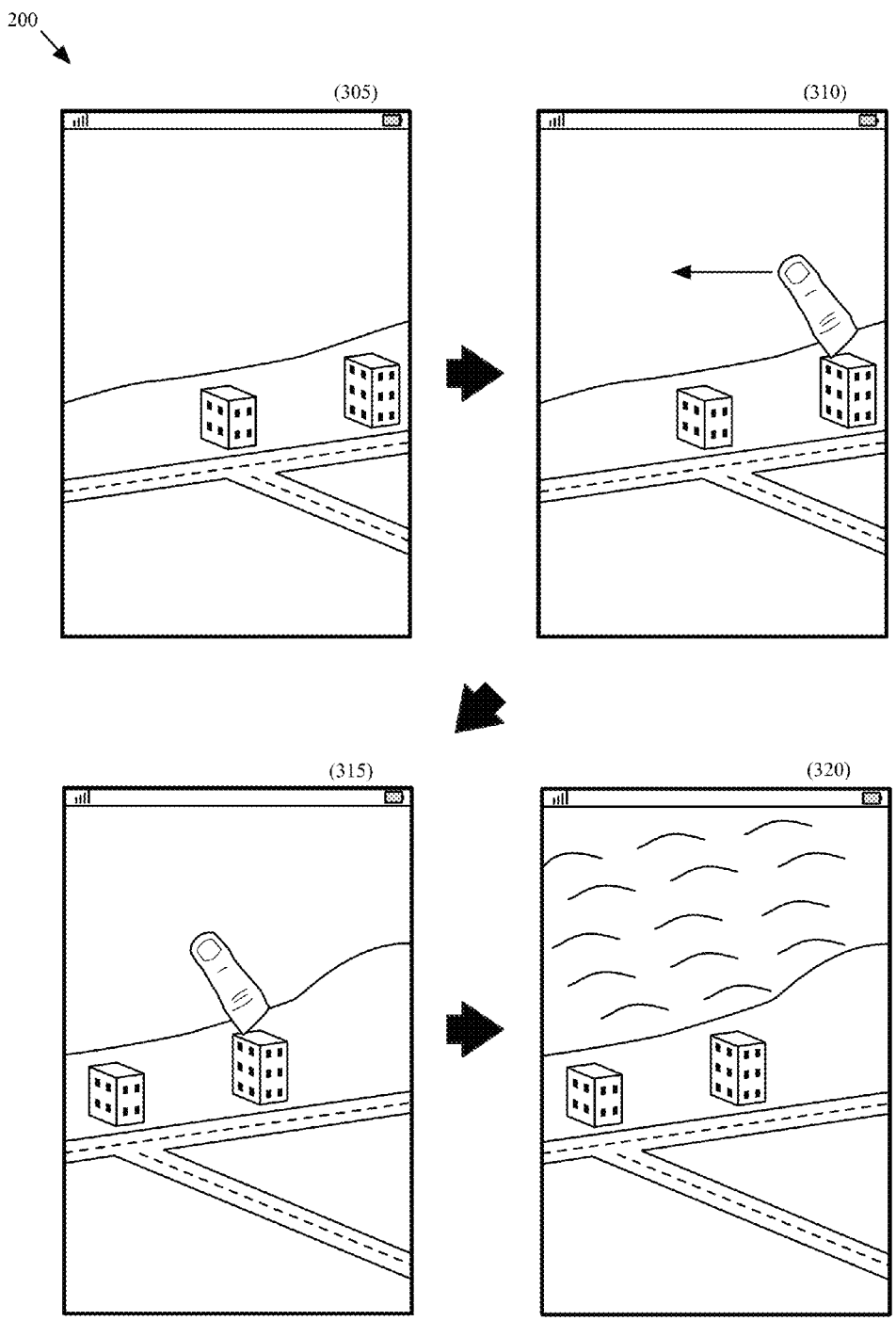
FIG. 3 conceptually illustrates an example of the mapping application of some embodiments animating water in a 3D satellite map view based on gesture input.

FIG. 3 conceptually illustrates an example of the mapping application of some embodiments animating water in a 3D satellite map view based on gesture input. Specifically, FIG. 3 illustrates the GUI 200 of the mapping application of some embodiments at four different stages 305-320 of animating a body of water in response to gesture input.

The first stage 305 is similar to the fourth stage 120 illustrated in FIG. 1 except that the animation of the body of water depicted by short curved lines in the body of water that conceptually represent ripple waves in the water is not shown for purposes of explanation and simplicity. As such, the first stage 305 of FIG. 3 illustrates a 3D satellite map view that includes two intersecting roads, two buildings, and a body of water behind the roads and buildings.

The second stage 310 illustrates a user performing a panning operation on the map. As shown, the user in this example pans the map by using a finger to touch a touchscreen of the device on which the mapping application is operating and dragging the finger along the touchscreen towards the left of the touchscreen in order to pan the map towards the right.

The third stage 315 illustrates the GUI 200 when the user is near the completion of the panning operation on the map. At this stage 315, the user has panned the map toward the right as the two roads and two buildings are shown farther towards the left than the roads and buildings illustrated in the second stage 310.

The fourth stage 320 illustrates the GUI 200 after the user has completed the panning operation on the map. In this example, the user completes the panning operating by lifting the finger off the touchscreen of the device. In some embodiments, when the mapping application receives the completion of the panning operation, the mapping application generates (e.g., using a shader for animating water waves) an animation of waves in the body of water that appear to be caused by the panning of the map. For this example, the mapping application generates waves that appear to roll from the right towards the left in the body of water. Such waves are shown in the fourth stage 320 by long curved lines in the body of water that conceptually represent the rolling waves.

Although FIG. 3 illustrates an example of animating water in a 3D satellite map view based on a particular gesture input, one of ordinary skill in the art will recognize that the mapping application of some embodiments generates animations of water wave effects for different types of gesture input. For example, in some embodiments, the mapping application generates animations of water wave effects in response to pinch gestures for decreasing the zoom level at which the map is viewed, spread gestures for increasing the zoom level at which the map is viewed, etc. In addition, the mapping application of some embodiments animates water in a 3D satellite map view based on gestures defined for performing additional and/or different types of map browsing operations (e.g., rotate, tilt, zoom, etc.)

Figure 4:
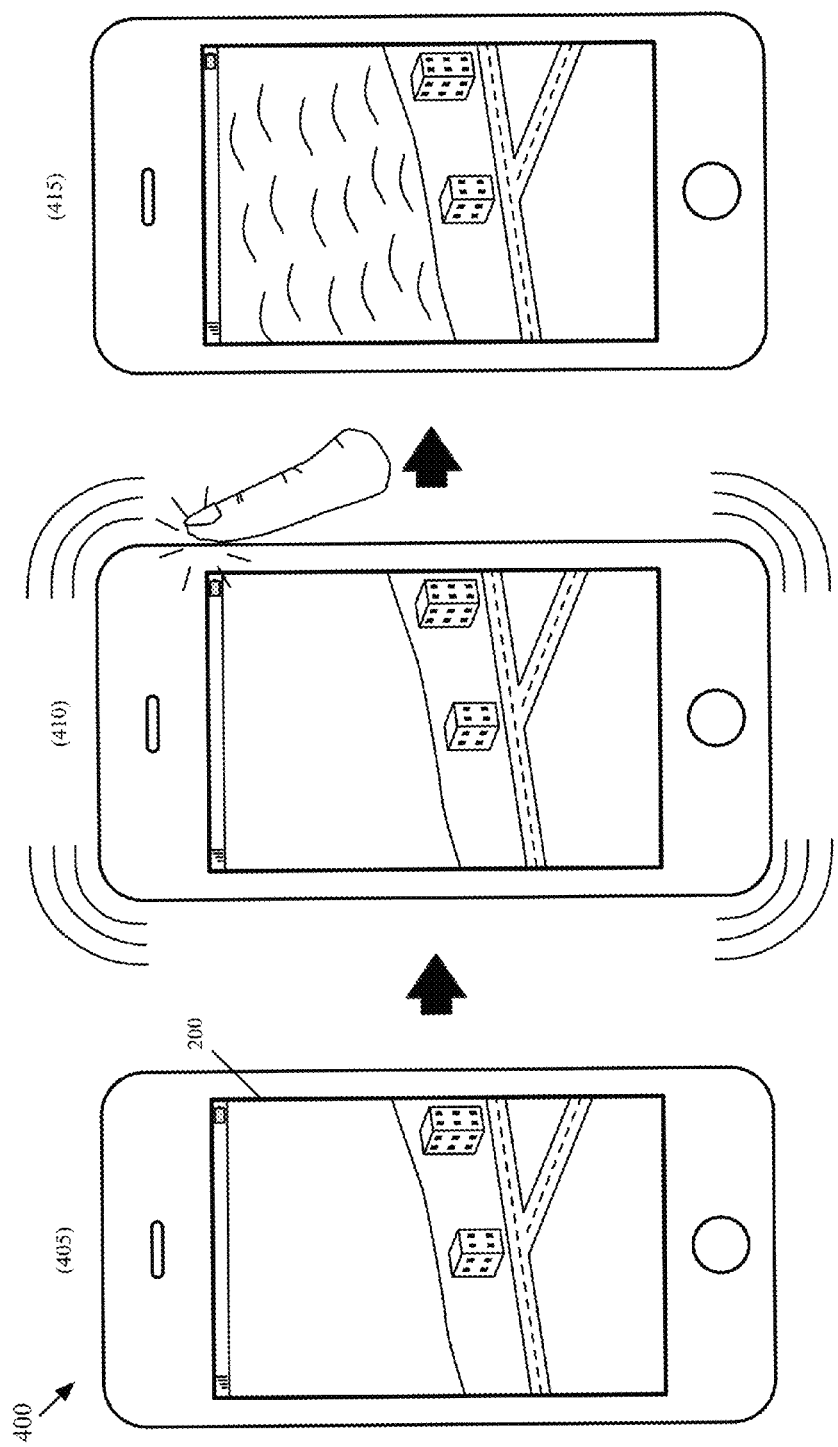
FIG. 4 conceptually illustrates an example of the mapping application of some embodiments animating water in a 3D satellite map view based on motion input.

FIG. 4 conceptually illustrates an example of the mapping application of some embodiments animating water in a 3D satellite map view based on motion input. In particular, FIG. 4 illustrates the GUI 200 of the mapping application of some embodiments, which is displayed on a device 400 on which the mapping application is operating, at three different stages 405-415 of animating a body of water in response to motion input.

The first stage 405 is similar to the fourth stage 120 illustrated in FIG. 1 except that the animation of the body of water depicted by short curved lines in the body of water that conceptually represent ripple waves in the water is not shown for purposes of explanation and simplicity. Thus, the first stage 405 shows a 3D satellite map view that includes two intersecting roads, two buildings, and a body of water behind the roads and buildings.

The second stage 410 illustrates a user moving the device 400 on which the mapping application is operating. As illustrated, in this example, the user moves the device 400 by using a finger to tap the right side of the device 400.

The third stage 415 illustrates the GUI 200 after the user has tapped the device 400. In some embodiments, when the mapping application detects movement of the device 400 (e.g., using a motion sensor, such as an accelerometer or gyroscope, of the device 400), the mapping application generates (e.g., using a shader for animating water waves) an animation of waves in the body of water that appear to be caused by the movement of the device 400. In this example, the mapping application generates an animation of waves that appear to roll from the right towards the left in the body of water. These waves are shown in the third stage 415 by long curved lines in the body of water that conceptually represent the rolling waves.

Figure 5:
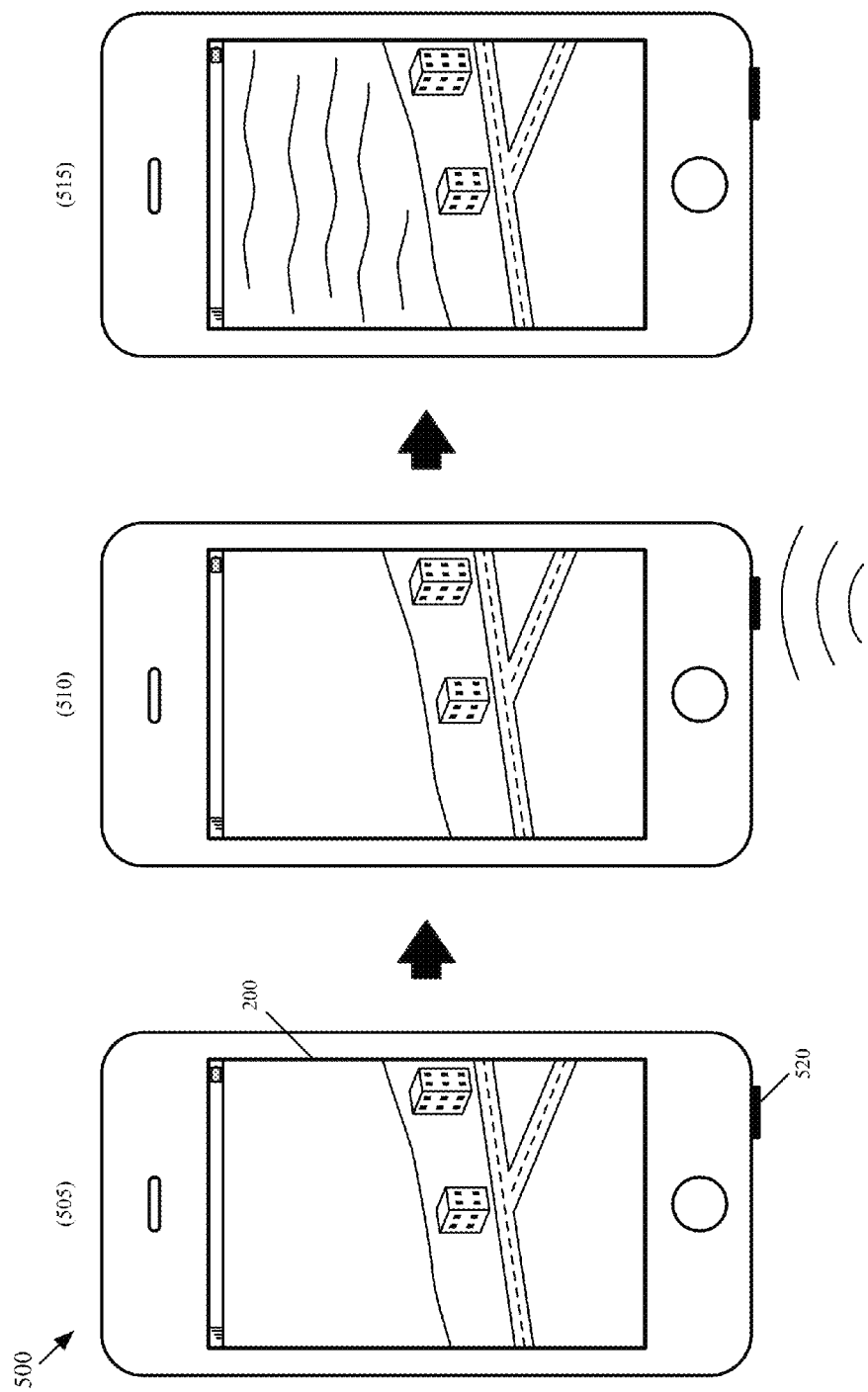
FIG. 5 conceptually illustrates an example of the mapping application of some embodiments animating water in a 3D satellite map view based on audio input.

FIG. 5 conceptually illustrates an example of the mapping application of some embodiments animating water in a 3D satellite map view based on audio input. Specifically, FIG. 5 illustrates the GUI 200 of the mapping application of some embodiments, which is displayed on a device 500 on which the mapping application is operating, at three different stages 505-515 of animating a body of water in response to audio input. As shown, the device 500 includes a microphone 520 for sensing sound.

The first stage 505 is similar to the fourth stage 120 illustrated in FIG. 1 except that the animation of the body of water depicted by short curved lines in the body of water that conceptually represent ripple waves in the water is not shown for purposes of explanation and simplicity. Therefore, the first stage 505 of FIG. 5 illustrates a 3D satellite map view that includes two intersecting roads, two buildings, and a body of water behind the roads and buildings.

The second stage 510 illustrates a user providing audio input for the microphone 520. As shown, the user in this example provides audio input for the microphone 520 by speaking towards the microphone 520, which is indicated by sound waves emanating towards the microphone 520.

The third stage 515 illustrates the GUI 200 after the user has provided audio input for the microphone 520 of the device 500. In some embodiments, when the mapping application detects sound through the microphone 520, the mapping application generates (e.g., using a shader for animating water waves) an animation of waves in the body of water that appear to be caused by the sound. For this example, the mapping application generates an animation of waves that appear to roll in the body of water away from the shore in a direction away from the microphone 520. These waves are shown in the third stage 515 by long curved lines in the body of water that conceptually represent the rolling waves.

The above-described figure illustrates an example of animating water in a 3D satellite map view based on sound detected from one microphone on a device on which the mapping application of some embodiments operates. One of ordinary skill in the art will understand that the device of some embodiments may include multiple microphones for detecting sound. In some embodiments, the mapping application operating on such a device generates the same or different animations of wave effects based on sound detected by different microphones.

B. Animations of Foliage

Figure 6:
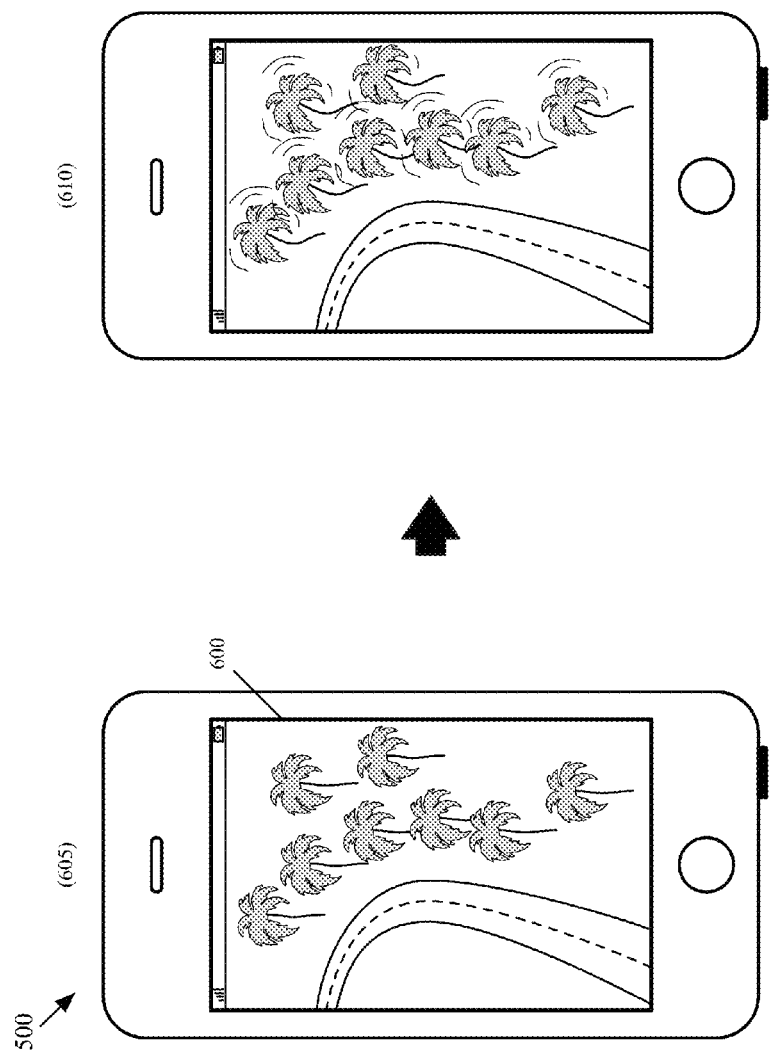
FIG. 6 conceptually illustrates an example of the mapping application of some embodiments animating foliage in a 3D satellite map view.

The examples described above by reference to FIGS. 1-5 illustrate animating water in a 3D satellite map view. FIG. 6 conceptually illustrates an example of the mapping application of some embodiments generating animations of foliage in a 3D satellite map view. In particular, FIG. 6 illustrates a GUI 600 of the mapping application of some embodiments, which is displayed on the device 500 on which the mapping application is operating, at two different stages 605-610 of animating foliage in a 3D satellite map view.

The first stage 605 illustrates the GUI 600 of the mapping application displaying a view of a map. In this example, the map view in a 3D satellite viewing mode. That is, the mapping application is in a satellite viewing mode and the view of the map is a 3D viewing mode is available (e.g., the zoom level of the map view is greater than a defined threshold zoom level at which a 3D view of the map is available) and enabled. As shown, the 3D satellite map view includes a curved road and several trees on the right side of the road.

The second stage 610 illustrates the GUI 600 after the user has provided input for causing the mapping application to generate (e.g., using a shader for animating foliage) an animation of swaying trees in the 3D satellite map view. Different embodiments of the mapping application generate the animation of swaying trees based on different types of input. For instance, in some embodiments, the mapping application generation the animation of swaying trees based on any of the different types of input described above by reference to FIGS. 2-5.

While FIG. 6 illustrates one example of animating foliage in a 3D satellite map view based on different types of input, one of ordinary skill in the art will recognize that the mapping application of some embodiments generates different animations of foliage based on different types of input. Alternatively or in conjunction with generating animations of foliage based on input, the mapping application of some embodiments generates animations of foliage without any input similar to the example described above by reference to FIG. 1.

C. Animations of Other Map Elements/Constructs

Figure 7:
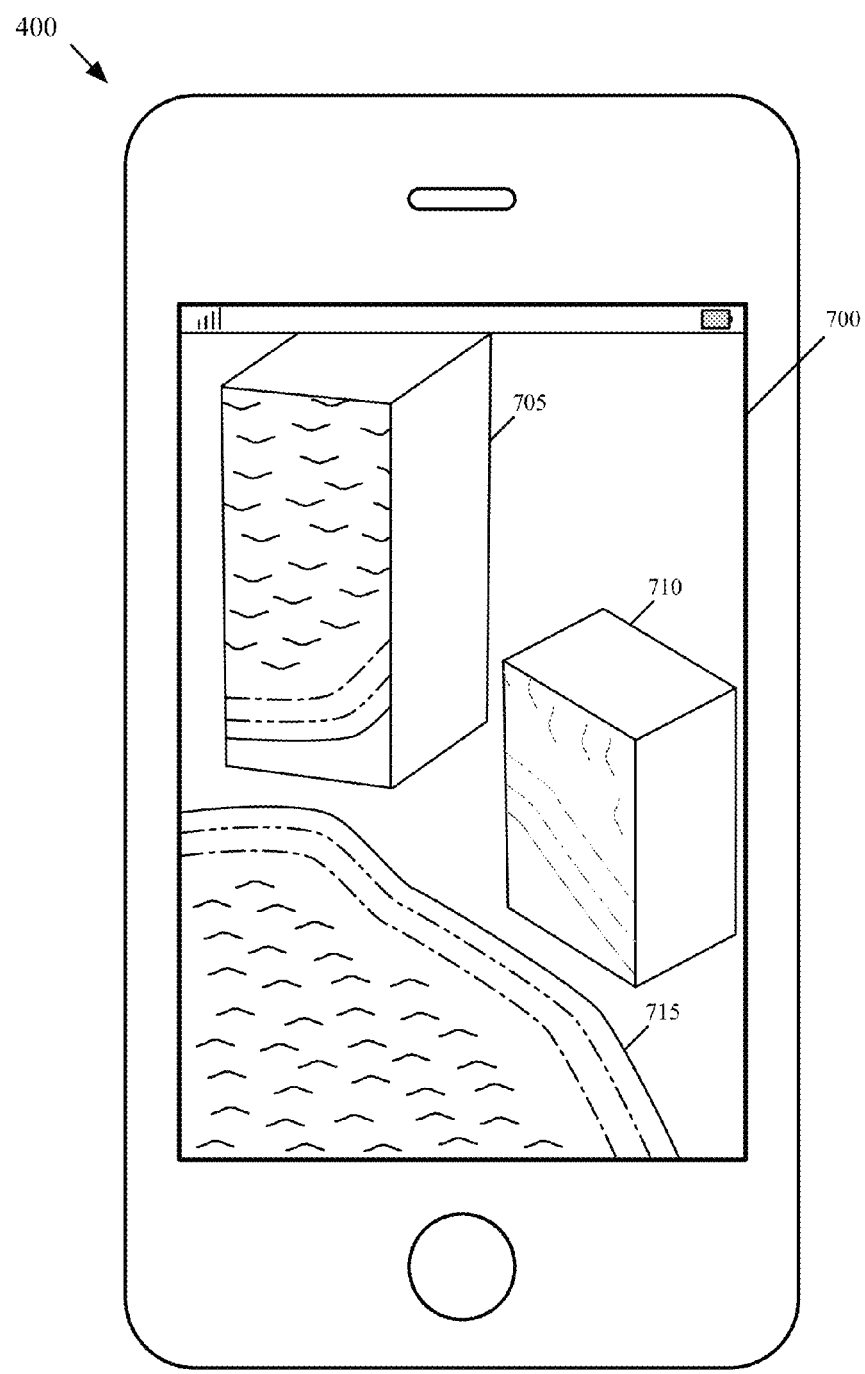
FIG. 7 conceptually illustrates an example of the mapping application of some embodiments animating reflections of water off the surface of buildings in a 3D satellite map view and animating shorelines in the 3D satellite map view.

As mentioned above, the animated 3D satellite map view feature of the mapping application of some embodiments generates animations of different defined types of map elements and/or constructs in a 3D satellite map view. FIG. 7 conceptually illustrates an example of the mapping application of some embodiments animating reflections of water off the surface of buildings in a 3D satellite map view and animating shorelines in the 3D satellite map view. Specifically, FIG. 7 illustrates a GUI 700 of the mapping application of some embodiments, which is displayed on the device 400 on which the mapping application is operating.

As shown, the GUI 700 illustrates a view of map includes a body of water and buildings 705 and 710. FIG. 7 is similar the fourth stage 120 described above by reference to FIG. 1 in that the mapping application in this example animates map elements are that are identified as bodies of water by generating (e.g., using a shader for animating still water) an animation of ripple waves in the water. The animation of the water in FIG. 7 is similarly depicted by short curved lines in the body of water that conceptually represent ripple waves in the water. The body of water illustrated in FIG. 7 includes a shoreline 715 along the edge of the body of water that abuts land. For this example, the mapping application generates (e.g., using a shader for animating waves along shorelines) an animation of waves rolling towards the land along the shoreline 715. The animation of the shoreline 715 is indicated by several dashed lines along the shoreline 715.

In this example, the surfaces of the building 705 have a highly reflective property (e.g., glass surfaces, mirror surfaces, etc.) and the surfaces of the building 710 have a low reflective property (e.g., brick surfaces, concrete surface, etc.). As such, the mapping application in this example generates (e.g., using a shader for animating reflections on building surfaces and treating the body of water and shoreline 715 as a source of light) animations of reflections of the ripple waves in the body of water and the rolling waves along the shoreline 715 off the surfaces of the buildings 705 and 710. Since the reflective property of the surfaces of the building 705 is higher than the reflective property off the surfaces of the building 710, the animation the reflection off the surfaces of the building 705 is greater than the animation of the reflection off the surfaces of the building 710. In this example, the reflection off the building 705 is darker than the reflection off the building 710 in order to indicate that the reflection off the building 705 is greater than the reflection off the building 710.

The figures described above show several examples of animating different types of map elements and/or constructs in a 3D satellite map view. One of ordinary skill in the art will realize that the mapping application of different embodiments animates any number of additional and/or different defined types of map elements and/or constructs. For instance, in some embodiments, the mapping application generates animations for different defined types of bodies of water (e.g., deep water, shallow water, oceans, lakes, rivers, reservoirs, harbors, etc.). In addition, the mapping application of some embodiments generates different animations for a particular defined type of map elements and/or construct based on different conditions (e.g., based on no input, different types of input, such as the ones described above by reference to FIGS. 3-5, etc.)

The mapping application of different embodiments uses different techniques to generate animations for different defined types of map elements and/or constructs. In some embodiments, the mapping application uses techniques to (1) move the vertices of polygons that represent map elements and/or (2) shade the vertices of the polygons in order to animate the map elements.

In some embodiments, when the mapping application generates animations by moving vertices of polygons, the mapping application uses a shader (e.g., a vertex shader) to move the vertices of the polygons, which in turn animates the textures that are mapped to the polygons. Such a shader is used in some embodiments to generate water ripples (e.g., the water ripples described above by reference to FIG. 2), swaying trees and/or foliage (e.g., the swaying trees described above by reference to FIG. 6), etc.

The mapping application of some embodiments moves the vertices of polygons based on interpolation. For example, in some embodiments, the mapping application vertically interpolates the vertices of polygons that represent trees and/or foliage in order to generate swaying trees and/or foliage. When using interpolation to move vertices of polygons, the mapping application of some embodiments interpolates the vertices using a defined range of motion to limit the motion of the vertices in order to minimize artifacts and computer resources for performing such an operation.

To generate different animations using the vertex moving technique, the mapping application of some embodiments moves the vertices of polygons differently. For instance, in some embodiments, the mapping application generates water ripples in a body of water by moving the vertices of the polygons that represent the body of water in a vertical direction (e.g. up, down). When the mapping application generates water waves in a body of water in response to a pan operation, the mapping application moves the vertices of the polygons that represent the body of water in vertical and horizontal directions (e.g., left, right, up, down).

When map elements and/or constructs are formed by interior polygons and exterior polygons, the mapping application of some embodiments interpolates the vertices of interior polygons and does not interpolate the vertices of exterior polygons. For instance, in some embodiments, when the mapping application animates a body of water by moving vertices of polygons that represent the body of water, the mapping application interpolates the vertices of all the polygons except the polygons along the perimeter of the body of water abutting land. Using a tree as another example, the mapping application of some embodiments interpolates the vertices of all the polygons representing the tree except for the polygons that form the bottom of the trees abutting land.

For the vertex shading technique, the mapping application of some embodiments animates map elements and/or constructs by modifying (e.g., using a texture shader) the color attributes of the vertices of the polygons that represent the map elements and/or constructs. For example, in some embodiments, the mapping application modifies the color attributes of the vertices of polygons that represent a body of water to generate water waves (e.g., the water waves illustrated in FIGS. 1, 3-5, and 7).

In some embodiments, the mapping application uses both the vertex moving technique and the vertex shading technique to generate animations. For instance, the mapping application of some embodiments generates water waves in a body of water in response to a pan operation (e.g., the water waves described above by reference to FIG. 3) by moving (e.g., left, right, up, down) the vertices of the polygons that represent the body of water and modifying the color attributes of the vertices of the polygons.

II. Image Processing

Figure 8:
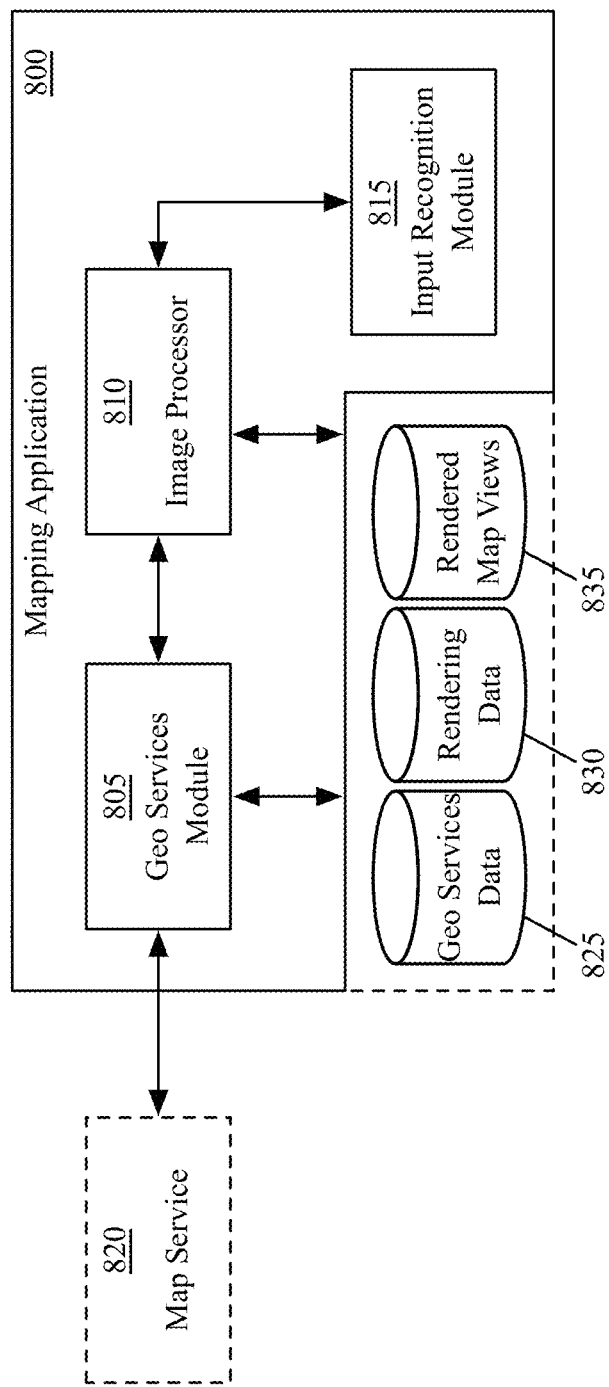
FIG. 8 conceptually illustrates a software architecture of a system of some embodiments.

In some embodiments, the examples and embodiments of the invention described above are implemented as software running on a particular machine, such as a computer, a handheld device, or a tablet computing device, or stored in a machine readable medium. FIG. 8 conceptually illustrates a software architecture of a mapping application 800 of some embodiments. In some embodiments, the mapping application 800 is a stand-alone application (e.g., Maps®, provided by Apple Inc.) for browsing a map, searching locations in the map, identifying routes in the map, navigating routes in the map, etc.

The mapping application 800 of some embodiments is integrated into another application while the mapping application 800 of other embodiments might be implemented within an operating system (e.g., iOS®, provided by Apple Inc.). Furthermore, in some embodiments, the mapping application 800 is provided as part of a server-based solution. In some such embodiments, the mapping application 800 is provided via a thin client. That is, the mapping application 800 runs on a server while a user interacts with the mapping application 800 via a separate machine remote from the server. In other such embodiments, the mapping application 800 is provided as a thick client. That is, the mapping application 800 is distributed from the server to the client machine and runs on the client machine.

As shown, the mapping application 800 includes a geo services module 805, an image processor 810, and an input recognition module 815. The mapping application 800 also includes geo services data storage 825, rendering data storage 830, and rendered map views storage 835.

In some embodiments, the geo services data storage 825 stores geographic data (also referred to as geodata or geo data). The geographic data of some embodiments includes data that represents objects (e.g., roads, buildings, landcover, foliage and/or vegetation, waterways, etc.) in the real world. The data that represents the objects in the real world includes in some embodiments vector data (e.g., points, lines, polygons, etc.), raster data (e.g., CCIs), or a combination of both vector and raster data. The rendering data storage 830 stores data for rendering map views. In some embodiments the rendering data includes texture data, color data, shadow data, shader data, and stylesheet data that specifies the rendering parameters (e.g., textures, colors, shadows, shaders, etc.) to use for rendering different map elements and/or constructs in the map view. The rendered map views storage 835 stores rendered views of maps.

In some embodiments, the storages 825-835 are implemented in one physical storage while, in other embodiments, the storages 825-835 are implemented on separate physical storages. Still, in some embodiments, some or all of the storages 825-835 are implemented across several physical storages.

The geo services module 805 is responsible for retrieving geo data for the image processor 810 to render map views. In some embodiments, the geo services module 805 is implemented as a set of services that receives requests from the image processor 810 for a particular set of geo data (e.g., geo data for a region of a map). When the geo services module 805 receives such requests from the image processor 810, the geo services module 805 of some embodiments retrieves the requested set of geo data from a map service 820 (e.g., via a network, such as the Internet) for providing map information and other map-related data, a local cache for storing cached geo data, a local storage for storing geo data, or any combination of aforementioned sources of geo data. Additional and/or different sources of geo data may be used in some embodiments. In some embodiments, the geo services module 805 passes the requested set of geo data to the image processor 810 while, in other embodiments, the geo services module 805 stores the requested set of geo data in the geo services data storage 825 for the image processor 810 to subsequently access.

The image processor 810 handles the rendering of map views for display on a display screen of a device on which the mapping application 800 operates. In some embodiments, the image processor 810 renders a map view based on information (e.g., input information, such as touch input, gesture input, motion input, audio input, etc.) received from the input recognition module 815. Based on the information from the input recognition module 815, the image processor 810 requests geo data from the geo services module 805 for rendering the map view. The image processor 810 of some embodiments (1) generates a virtual map based on the requested geo data (2) uses a rendering engine to render a view of the virtual map identified by a virtual camera. Once the map view is rendered, the image processor 810 of some embodiments stores the map view in the rendered map views storage 835 for the mapping application 800 to access and display on the display screen of the device.

The input recognition module 815 identifies the type of and interprets input data received from input device drivers (not shown in FIG. 8), such as a touchscreen device driver, an audio device driver, a motion device driver, etc. that are part of an operating system running on the device. In some embodiments, the input device drivers translate signals from input devices and/or input sensors into input data that is provided to the input recognition module 815.

While many of the features have been described as being performed by one module (e.g., the geo services module 805, the image processor 810, etc.), one of ordinary skill in the art would recognize that the functions might be split up into multiple modules. Similarly, the functions described as being performed by multiple different modules might be performed by a single module in some embodiments (e.g., the geo services module 810 might be part of the image processor 810).

Figure 9:
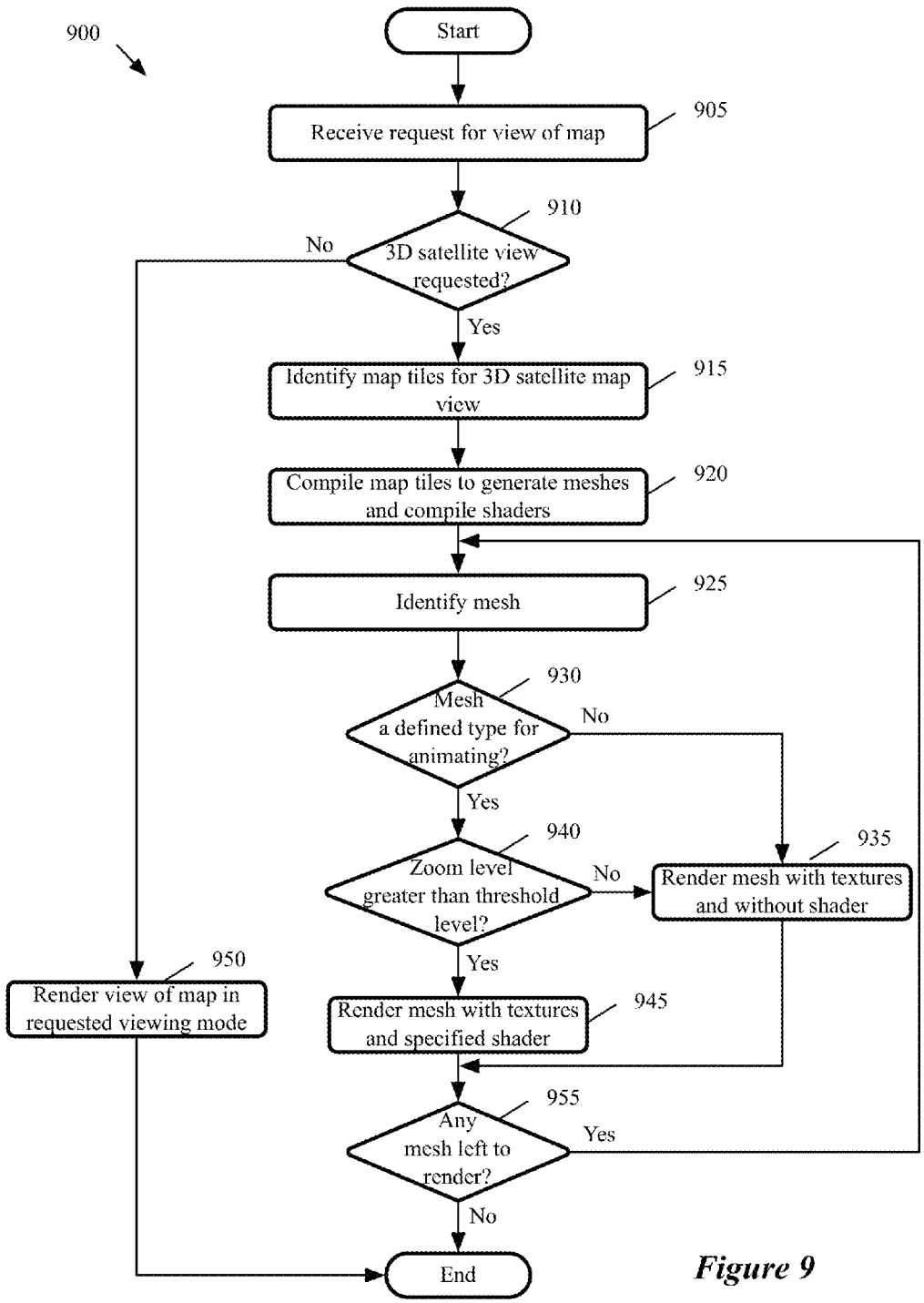
FIG. 9 conceptually illustrates a process of some embodiments for animating 3D satellite map views.

FIG. 9 conceptually illustrates a process 900 of some embodiments for animating 3D satellite map views. In some embodiments, the mapping application (e.g., the image processor 810 described above by reference to FIG. 8) performs the process 900 when the mapping application renders a map view (e.g., when the mapping application is in a map-browsing mode, location-search mode, route-identification mode, route-navigation mode, etc.) for display on a device on which the mapping application is operating.

The process 900 starts by receiving (at 905) a request for a view of a map. Next, the process 900 determines (at 910) whether the requested is for a 3D satellite map view of the map. In some embodiments, the request is for a 3D satellite map view when (1) the mapping application is in a satellite viewing mode (e.g., the satellite viewing mode is activated by selecting the satellite viewing mode control 170 illustrated in FIG. 1) and (2) the mapping application is in a 3D viewing mode (e.g., when the zoom level of the requested map view is greater than a defined threshold zoom level and the 3D viewing mode is activated by selecting the 3D control 150 illustrated in FIG. 1).

When the process 900 determines that the request is not for a 3D satellite map view of the map, the process 900 renders (at 950) the view of the map in the requested viewing mode. Then process 900 then ends.

When the process 900 determines that the request is for a 3D satellite map view of the map, the process 900 identifies (at 915) a set of map tiles for the 3D satellite map view. In some embodiments, the process 900 identifies the set of map tiles by accessing a map service for providing map information and other map-related data, a local cache for storing cached geo data, a local storage for storing geo data, or any combination of the aforementioned sources of map tiles.

The process 900 then compiles (at 920) the set of map tiles to generate a set of meshes and compiles a set of shaders. In some embodiments, the set of shaders that the process 900 compiles includes shaders that are specified for the types of meshes that process 900 generates by compiling the set of map tiles. For instance, the process 900 of some embodiments compiles a set of shaders for animating water (e.g., a shader for animating still water, a shader for animating water ripples, a shader for animating water waves, etc.) when the set of generated meshes includes a water mesh; a set of shaders for animating building surfaces (e.g., a shader for animating reflections on building surfaces) when the set of generated meshes includes a building mesh; a set of shaders for animating shorelines (e.g., a shader for animating waves along shorelines) when the set of generated meshes includes a shoreline mesh; a set of shaders for animating foliage (e.g., a shader for animating still foliage; a shader for animating swaying foliage, etc.) when the set of generated meshes includes a foliage mesh; etc. In some instances, one or more of the set of shaders are already compiled, and, thus, do not need to be compiled.

After compiling the map tiles and any necessary shaders, the process 900 identifies (at 925) a mesh in the set of generated meshes. Next, the process 900 determines (at 930) whether the identified mesh is a type of mesh defined for animating. As noted above, the animated 3D satellite map view feature of the mapping application animates different defined types of map elements and/or constructs in a 3D satellite map view. When the process 900 determines that the identified mesh is not a type of mesh defined for animating, the process 900 renders (at 935) the identified mesh with textures specified for the mesh (e.g., specified in a stylesheet) and without any shaders. The process 900 then proceeds to 955.

When the process 900 determines that the identified mesh is a type of mesh defined for animating, the process 900 determines (at 940) whether the zoom level (also referred to as the level of detail) of the requested view of the map is greater than a threshold zoom level (e.g., zoom level 15, zoom level 18, zoom level 20, etc.). When the process 900 determines that the zoom level of the requested view of the map is not greater than the threshold zoom level, the process 900 renders (at 935) the identified mesh with textures specified for the mesh (e.g., specified in a stylesheet) and without any shaders. The process 900 then proceeds to 955.

When the process 900 determines that the zoom level of the requested view of the map is greater than the threshold zoom level, the process 900 renders (at 945) the identified mesh with textures specified for the mesh (e.g., specified in a stylesheet) and a shader specified for the mesh. The process 900 then proceeds to 955.

Finally, the process 900 determines (at 955) whether any mesh is left to render in the set of generated meshes. When the process 900 determines that a mesh is left to render, the process 900 returns to 925 to continue rendering any remaining meshes in the set of generated meshes. Otherwise, the process 900 ends.

Figure 10:
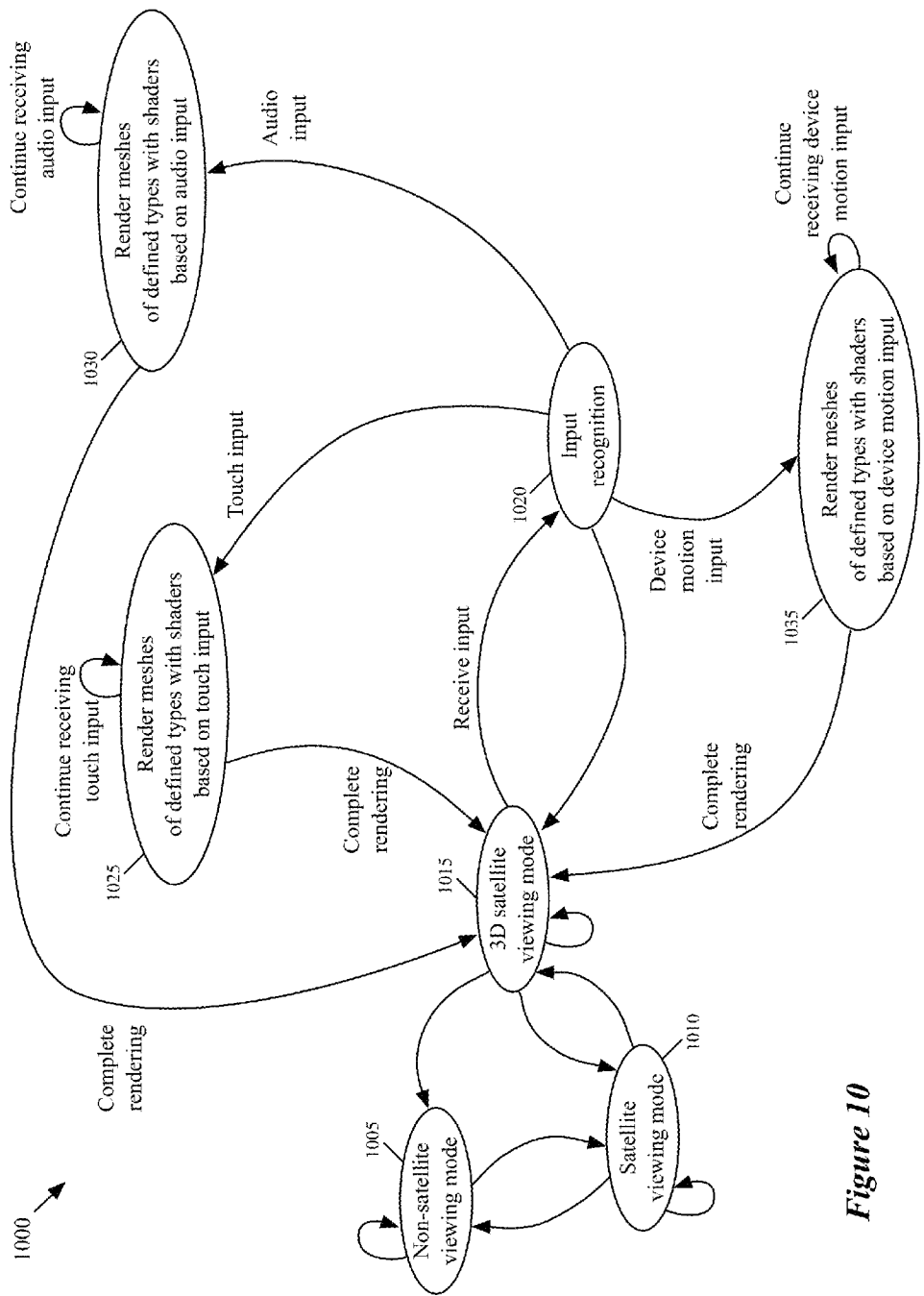
FIG. 10 conceptually illustrates a state diagram of a mapping application of some embodiments.

FIG. 10 conceptually illustrates a state diagram 1000 of a mapping application of some embodiments. As shown, the state diagram 1000 includes states 1005-1035 of the mapping application 1000 when the mapping application 1000 renders defined types of map elements and/or constructs in 3D satellite map views based on different types of input.

At state 1005, the mapping application renders non-satellite map views for display on a device on which the mapping application 1000 is operating. In some embodiments, a non-satellite map view is a map view that is rendered without using any CCIs. The mapping application 1000 of some embodiments enters state 1005 when the mapping application is in a route-navigation mode or a non-satellite viewing mode is activated (e.g., by selecting the standard viewing mode control 160 illustrated in FIG. 1). While in state 1005, the mapping application 1000 transitions to state 1010 when a satellite viewing mode is activated (e.g., by selecting the satellite viewing mode control 170 illustrated in FIG. 1).

At state 1010, the mapping application 1000 renders satellite map views for display on the device on which the mapping application 1000 is operating. In some embodiments, a satellite map view is a map view that is rendered by texture mapping CCIs to the map. While in state 1010, the mapping application 1000 transitions to state 1015 when a 3D viewing mode is available (e.g., the zoom level of the map view is greater than a defined threshold zoom level at which a 3D view of the map is available) and enabled (e.g., by selecting the 3D control 150 illustrated in FIG. 1).

In state 1015, the mapping application 1000 renders 3D satellite map view for display on the device on which the mapping application 1000 is operating. In some embodiments, the mapping application animates defined types of map elements and/or constructs in the 3D satellite map views. For instance, the mapping application 1000 of some embodiments generates animations of ripples waves in bodies of water in a manner similar to the example described above by reference to FIG. 1 and animations of waves along shorelines and reflections on buildings in a similar fashion as that described above by reference to FIG. 7. While in state 1015, the mapping application 1000 transitions to state 1020 when the mapping application 1000 receives any type of input.

At state 1020, the mapping application 1000 differentiates between different types of input and translates these types of input into different 3D satellite map view rendering operations. In some embodiments, the mapping application 1000 receives the input as translated by the operating system of the device on which the mapping application 1000 is operating and identifies the type of input received from the operating system. While in state 1020, the mapping application 1000 transition to a different state based on the identified type of input. In this example, the mapping application 1000 transitions to state 1025 when the mapping application 1000 receives touch input, transitions to state 1030 when the mapping application 1000 receives audio input, and transitions to state 1035 when the mapping application 1000 receives motion input.

When the mapping application 1000 transitions to state 1025, the mapping application 1000 renders defined types of meshes in 3D satellite map views with shaders based on touch input. In some embodiments, the mapping application 1000 renders defined types of meshes differently based on different types of touch input. For instance, when the mapping application 1000 receives a tap input for selecting a location in the water, the mapping application 1000 renders water using a shader for animating water ripples similar to the example described above by reference to FIG. 2 and foliage using a shader for animating foliage similar to the example described above by reference to FIG. 6. As another example, when the mapping application 1000 receives a touch and drag input for panning the map, the mapping application 1000 renders water using a shader for animating water waves similar to the example described above by reference to FIG. 3 and foliage using a shader for animating foliage similar to the example described above by reference to FIG. 6.

While the mapping application 1000 continues to receive the touch input, the mapping application 1000 stays in state 1025 and continues to render the defined types of meshes with shaders specified for touch input. When the mapping application 1000 no longer receives the touch input, the mapping application 1000 completes the rendering of the defined types of meshes with the shaders and returns to state 1015.

In some embodiments, the mapping application 1000 renders the defined types of meshes with the shaders differently when the mapping application 1000 is receiving input and when the mapping application 1000 no longer receives input and is completing the rendering. For instance, when the mapping application 1000 stops receiving a touch and drag input for panning the map, the mapping application 1000 of some embodiments renders a deceleration of the panning operation. When the deceleration of the map stops, the mapping application 1000 of some such embodiments animates water shifting and foliage swaying in a manner that appears to be caused by the panning of the map stopping.

When the mapping application 1000 transitions to state 1030, the mapping application 1000 renders defined types of meshes in 3D satellite map views with shaders based on audio input. For example, when the mapping application 1000 receives audio input, the mapping application 1000 renders water using a shader for animating water waves similar to the example described above by reference to FIG. 5 and foliage using a shader for animating foliage similar to the example described above by reference to FIG. 6.

While the mapping application 1000 continues to receive the audio input, the mapping application 1000 stays in state 1030 and continues to render the defined types of meshes with shaders specified for audio input. When the mapping application 1000 no longer receives the audio input, the mapping application 1000 completes the rendering of the defined types of meshes with the shaders and returns to state 1015.

When the mapping application 1000 transitions to state 1035, the mapping application 1000 renders defined types of meshes in 3D satellite map views with shaders based on motion input of movement of the device on which the mapping application 1000 is operating. For instance, when the mapping application 1000 receives motion input, the mapping application 1000 renders water using a shader for animating water waves similar to the example described above by reference to FIG. 4 and foliage using a shader for animating foliage similar to the example described above by reference to FIG. 6.

While the mapping application 1000 continues to receive the motion input, the mapping application 1000 stays in state 1035 and continues to render the defined types of meshes with shaders specified for motion input. When the mapping application 1000 no longer receives the motion input, the mapping application 1000 completes the rendering of the defined types of meshes with the shaders and returns to state 1015.

Figure 11:
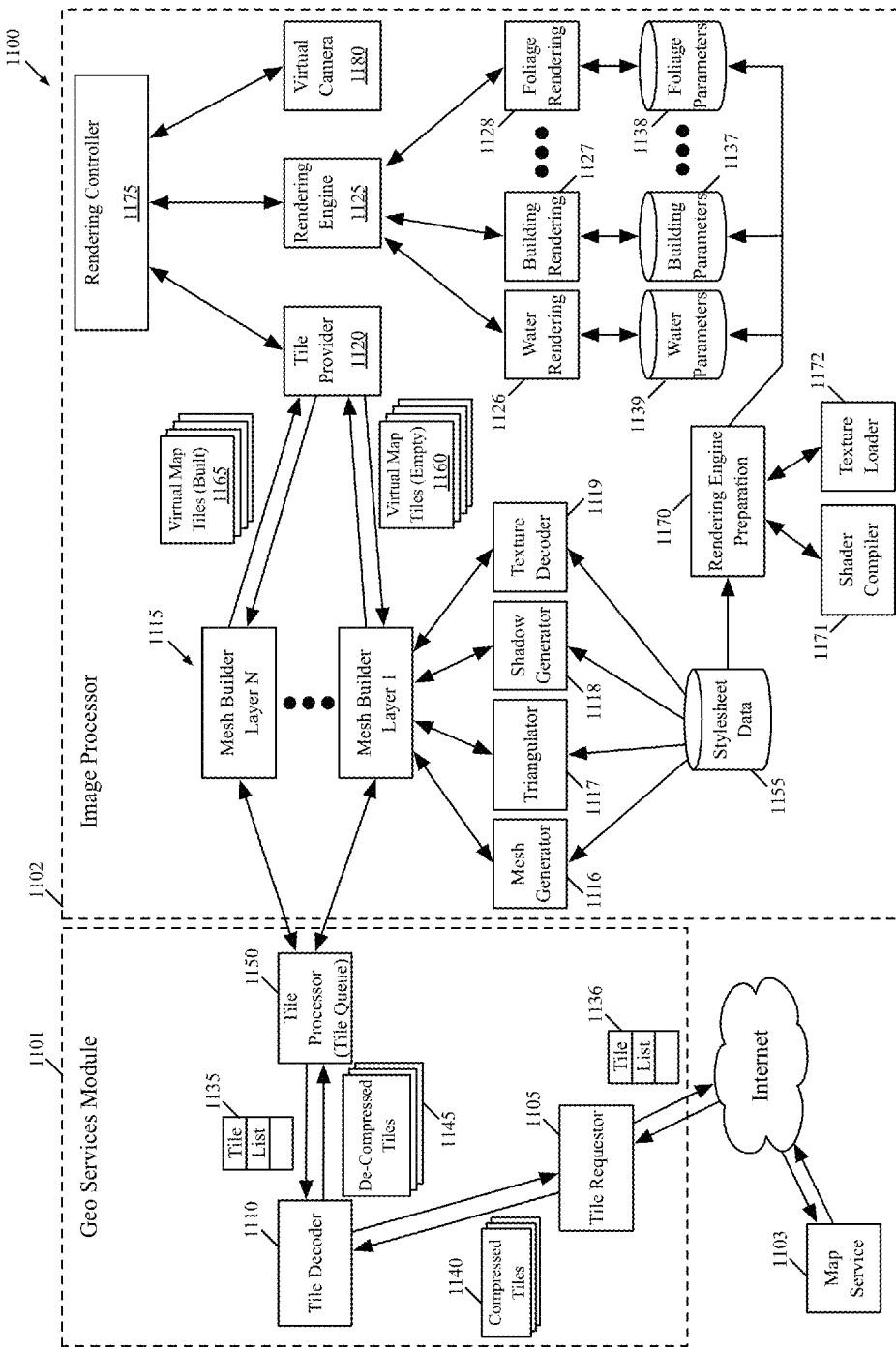
FIG. 11 conceptually illustrates a processing pipeline performed by the mapping application of some embodiments in order to render a view of a map for display at the client device.

FIG. 11 conceptually illustrates a processing pipeline 1100 performed by the mapping application of some embodiments in order to render a view of a map for display at the client device (e.g., on a display screen of the client device). As illustrated, the processing pipeline 1100 includes a geo services module 1101 and an image processor 1102. In some embodiments, the geo services module 1101 and the image processor 1102 implement the corresponding geo services module 805 and the image processor 810 illustrated in FIG. 8. The geo services module 1101 includes a requestor 1105, a tile decoder 1110, a tile processor 1150, a set of mesh builders 1115, a tile provider 1120, a virtual camera 1188, and a rendering engine 1125.

The tile processor 1150 of some embodiments receives requests for map tiles from the mesh builders 1115 and performs a multiplexing operation before forwarding the requests. The mesh builders 1115, as will be described below, identify existing map tiles (that are stored on a map service 1103 server or in a cache on the device performing the processing pipeline 1100) needed to build their respective meshes. In some embodiments, the map tiles are referenced as nodes of a quadtree. The tile processor acts as a multiplexer when multiple mesh builders request the same tile. As the mesh builders request tiles, in some embodiments the tile processor 1150 stores these tiles in its queue. After either a particular period of time or after a particular number of tiles have been requested, the tile processor 1150 flushes the queue and sends the tile list to the tile decoder 1110.

The tile decoder 1110 receives the multiplexed tile list 1135 from the tile processor 1150 and handles the return of decompressed tiles 1145 to the tile processor 1150. In some embodiments, the tile decoder 1110 first checks one or more local caches to determine whether it has the requested tiles stored at the device on which the mapping application operates. In some embodiments, the geo services module 1101 include a first tile cache stored on non-volatile memory (e.g., disk, flash memory, etc.) as well as a second tile cache stored in volatile memory (e.g., random access memory). When the tile decoder 1110 finds the tiles in one of the caches, it sends these tiles back to the tile processor 1150 (for return to the requesting mesh builder(s) 1115.

When the tile decoder 1110 does not have the tiles in its cache, it sends a request to the requestor 1105 for the remaining tiles. Upon receiving these map tiles 1140 in a compressed format, the tile decoder decompresses the received tiles to generate decompressed tiles 1145. In some embodiments, after generating the map tiles as described above, the map service 1103 also compresses the tiles using an encoding technique (e.g., a Lempel-Ziv-Markov chain algorithm (LZMA)). Different embodiments use different encoding techniques. The tile decoder 1110 returns these decompressed tiles 1145 to the tile processor 1150, and in some cases also stores them in one or both of the tile caches.

The requestor 1105, in some embodiments, receives requests for map tiles from the tile decoder 1110 (which in turn receives the requests from the tile processor 1150). These map tiles, in some embodiments, are stored on a server (e.g., a server of the map service 1103 to which the user's device connects). The requestor sends a tile list 1136 (received from the tile decoder 1110) that identifies the tiles needed from the map service 1103 (and not available in the tile caches. In some embodiments, the requestor takes advantage of the operating device's network connections (e.g., a Wi-Fi connection, a GSM connection, etc.) to contact the map service 1103 through the Internet to retrieve the needed map tiles. Upon receiving the tiles (in a compressed form) from the map service 1103, the requestor 1105 returns the compressed tiles 1140 to the tile decoder.

In some embodiments, the requestor 1105 (or the tile processor 1150, or a different portion of the pipeline) identifies tiles at additional zoom levels that cover the same geographical area as the initially requested tiles, and adds these tiles to the request list 1136 so that the tiles will be available if needed in the near future. In addition, some embodiments automatically request tiles at the same (or different zoom levels) for nearby geographical regions, in order to have the tiles available in case the user pans the map. In some embodiments, the requestor 1105, tile decoder 1110, and tile processor 1150 function as an independent portion of the processing pipeline, with the mesh builders 1115 as the "clients" of this section.

The mesh builders 1115 (also referred to as tile sources) of some embodiments are instantiated by the tile provider 1120 in order to build different layers of virtual map tiles. Depending on the type of map being displayed by the mapping application, the tile provider 1120 may instantiate a different number and different types of mesh builders 1115. For instance, for a satellite view map, the tile provider 1120 might only instantiate one mesh builder 1115, as the satellite map tiles of some embodiments do not contain multiple layers of data. In some embodiments, the satellite map tiles include an already-built mesh generated at the map service 1103 for which the CCIs (e.g., images taken by a satellite, space shuttle, airplane, helicopter, etc.) are used as textures. However, in some embodiments, additional mesh builders may be instantiated for generating the labels to overlay on the CCIs when rendering map views in a hybrid viewing mode. For a 2D or 3D rendered vector map (i.e., a non-CCI map), some embodiments instantiate separate mesh builders 1115 to build meshes for landcover polygon data (e.g., parks, bodies of water, etc.), roads, place of interest markers, point labels (e.g., labels for parks, etc.), road labels, traffic (if displaying traffic), buildings, raster data (for certain objects at certain zoom levels), as well as other layers of data to incorporate into the map.

The mesh builders 1115 of some embodiments receive "empty" virtual map tiles 1160 from the tile provider 1120 and return "built" virtual map tiles 1165 to the tile provider 1120. That is, the tile provider 1120 sends to each of the mesh builders 1115 one or more virtual map tiles 1160. Each of the virtual map tiles 1160 indicates an area of the world for which to draw a mesh. Upon receiving such a virtual map tile 1160, a mesh builder 1115 identifies the map tiles needed from the map service 1103, and sends its list to the tile processor 1150.

Upon receiving the tiles back from tile processor 1150, the mesh builder uses vector data stored in the tiles to build a polygon mesh for the area described by the virtual map tile. In some embodiments, the mesh builder 1115 uses several different functions to build the mesh. These functions include the mesh generator 1116, the triangulator 1117, the shadow generator 1118, and the texture decoder 1119. In some embodiments, these functions (and additional mesh building functions) are available to each mesh builder, with different mesh builders 1115 using different functions. For instance, the mesh builder responsible for the buildings layer may use a mesh generator 1116 and a triangulator 1117. In addition, several different types of shadow generators may be available to the mesh builder 1115, including a first shadow generator for creating dynamic shadows (that change as the map rotates) and a second shadow generator for creating a raster image drop shadow.

The mesh generator 1116 generates a mesh of vertices using the tile vector data, in some embodiments. The triangulator 1117 generates triangles from the mesh, to simplify the eventual rendering. The shadow generator 1118 adds shadows to the mesh (e.g., by labeling vertices and/or polygons with values indicating to the renderer to draw a shadow, or how dark of a shadow to draw. The texture decoder 1119 decodes texture information (e.g., from a stylesheet) and applies the texture information to the mesh. In different embodiments, the texture information may indicate colors, patterns, etc. to add to the polygons when rendered, which is encoded into the mesh.

In some embodiments, the texture information may be determined based on stylesheet data 1155. Furthermore, some embodiments also use this stylesheet data 1155 to determine the shadow, triangulation, and or mesh construction data. Using stylesheet-driven rendering enables simple modification to many aspects of the map output, because changes to a texture, color, etc. can be made through a minor modification of a stylesheet. As a result, textures can be dynamically created on the fly. An example benefit of the stylesheet-driven rendering is the facilitation of using different textures for certain types of objects at different zoom levels or geographic regions. For instance, when viewed at a low zoom level (less detail), some embodiments might color a park a simple light green. On the other hand, as the user zooms in to a higher zoom level (more detail), the stylesheets indicate to apply a pattern (e.g., a foliage pattern) to the park region. Similarly, patterns at higher zoom levels could be added to buildings, bodies of water, asphalt, urban land cover, etc. This information can be coded into a stylesheet and then the mesh builder simply adds the appropriate texture information to a tile mesh based on the zoom level of the tile.

By tagging roads (e.g., as urban, suburban, or rural), the map service 1103 can induce the client application to use different textures for the land cover regions around those roads. In addition, land cover region tags can be updated by the server based on metrics indicative of the sort of area covered by the land cover region. For instance, some embodiments (on the map service 1103 end) determine the density of mobile devices within the region (e.g., based on the number of devices accessing the map service 1103) and generate tags for the land cover. The stylesheets stored by the client devices (which may be updated from the map service 1103, in some embodiments) then indicate how to draw these land cover regions. Similarly, different styles can be used for rendering aspects of different regions (e.g., desert, forest, rocky, etc. for land cover; different colors for labels in different states; or other such distinctions).

Each mesh builder 1115 returns its virtual map tiles 1165 to the tile provider 1120 with its layer of the mesh filled in. The tile provider 1120 receives from the rendering controller 1175 a particular view (i.e., a volume, or viewing frustum) that represents the map view to be displayed (i.e., the volume visible from the virtual camera 1180). The tile provider performs any culling (e.g., removing surface area too far away, removing objects that will be entirely behind other objects, etc.) in some embodiments, then sends the virtual map tiles 1160 to the mesh builders 1115.

In some embodiments, the tile provider 1120 receives the built virtual map tiles 1165 from the different mesh builders at different times (e.g., due to different processing times to complete more and less complicated meshes, different time elapsed before receiving the necessary map tiles from the tile processor 1150, etc.). Once all of the layers of virtual map tiles have been returned, the tile provider 1120 of some embodiments puts the layers together and releases the data to the rendering controller 1175 for rendering.

In some embodiments, the tile provider 1120 may have already received a new camera volume for which to build a mesh before the mesh builders have returned their data. For instance, when the user quickly pans or zooms a map, the data returned by the mesh builders may be out of date. In some embodiments, the tile provider either drops the built virtual map tile layers or stores them in memory. Whether to drop the built virtual map tiles depends, in different embodiments, on whether it is likely the built tiles will be needed soon (e.g., how much the user has moved the virtual camera, whether a navigation is running that makes it unlikely the application will display the older data) and the amount of memory currently in use.

The virtual camera 1180 generates a volume or surface for the pipeline 1100 to render, and sends this information to the rendering controller 1175. Based on a particular location and orientation from which the map will be rendered (i.e., the point in 3D space from which the user "views" the map), the virtual camera identifies a field of view to actually send to the tile provider 1120. In some embodiments, when the mapping application is rendering the 3D perspective view for navigation, the field of view of the virtual camera is determined according to an algorithm that generates a new virtual camera location and orientation at regular intervals based on the movement of the user device.

The rendering controller 1175 is responsible for managing the tile provider 1120, virtual camera 1180, and rendering engine 1125 in some embodiments. In some embodiments, multiple tile providers may actually be instantiated, and the rendering controller 1175 puts together several virtual map tiles (e.g., map tiles and building tiles) to create a scene that is handed off to the rendering engine 1125.

The rendering engine 1125 is responsible for generating a drawing to output to a display device based on the mesh tiles 1165 sent from the virtual camera. As shown, the rendering engine 1125 of some embodiments has several sub-processes.

In some embodiments, each different element is rendered by a different sub-process, with the rendering engine 1125 handling the occlusion of different layers of objects (e.g., placing labels above or behind different buildings, generating roads on top of land cover, etc. FIG. 11 illustrates a water rendering process 1126, a building rendering process 1127, and a foliage rendering process 1128. Examples of additional processes include a road rendering process, a label rendering process, a raster traffic rendering process, a raster road rendering process, a satellite rendering process, a polygon rendering process, a background raster rendering process, etc.

Each of the rendering processes includes a set of rendering parameters; illustrated are water parameters 1139, building parameters 1137, and foliage parameters 1138. In some embodiments, this data includes information on the manner in which to render (e.g., shader information, textures to use, etc.) bodies of water, building surfaces, and foliage.

In some embodiments, these sets of rendering parameters are generated at least in part by a rendering engine preparation operation 1170. The rendering engine preparation operation 1170 includes a shader compiler 1171 and a texture loader 1172, among other operations. The shader compiler 1171 compiles shaders that the rendering engine will use. For instance, the shader compiler 1171 compiles shaders for animating defined types of meshes in a 3D satellite map view when the rendering engine will render the 3D satellite map view. The texture loader 1172 loads texture information (e.g., into the rendering parameters). For example, the texture loader 1172 loads textures for shaders that animate defined types of meshes in a 3D satellite map view when the rendering engine will render the 3D satellite map view. This texture information may come from the stylesheet data 1155 in some embodiments.

The operation of the rendering pipeline 1100 in some embodiments will now be described. Based on user input to view a particular map region at a particular zoom level, the virtual camera 1180 specifies a location and orientation from which to view the map region, and sends this viewing frustum, or volume, to the rendering controller 1175. The rendering controller 1175 instantiates one or more tile providers. While one tile provider 1120 is shown in this figure, some embodiments allow the instantiation of multiple tile providers at once. For instance, some embodiments instantiate separate tile providers for building tiles and for map tiles.

The tile provider 1120 performs any culling necessary to generate an empty virtual map tile identifying regions of the map region for which a mesh needs to be built, and sends the empty virtual map tiles 1160 to the mesh builders 1115, which are instantiated for the different layers of the drawn map (e.g., roads, land cover, POI labels, etc.). The mesh builders 1115 use a manifest received from the map service 1103 that identifies the different tiles available on the map service 1103 server (i.e., as nodes of a quadtree). The mesh builders 1115 request specific map tiles from the tile processor 1150, which removes any duplicate requests and sends a tile list 1135 to the tile decoder 1110.

The tile decoder 1110 determines whether the requested tiles are stored in the tile caches (either the non-volatile storage cache or the volatile storage cache), and returns any such tiles to the tile processor 1150 for distribution to the requesting mesh builders 1115. For any tiles not already stored locally, the tile decoder 1110 sends a request to the requestor 1105, which sends tile list 1136 (a pared-down version of tile list 1135) to a remote map service 1103 server. The requestor 1105 receives from the map service 1103, and forwards to the tile decoder 1110, the requested map tiles in compressed form 1140. The tile decoder 1110 decompresses (e.g., decodes) these tiles, stores them in its cache(s), and sends the decompressed tiles 1145 to the tile processor 1150 for return to the mesh builders 1115.

Once a particular mesh builder 1115 has received its map tiles, it begins using the vector data stored in the map tiles to build the mesh for the virtual map tiles sent from the tile provider 1120. After building the mesh for its map layer, the mesh builder 1115 sends the built virtual map tile 1165 back to the tile provider 1120. The tile provider 1120 waits until it has received all of the virtual map tiles from the various mesh builders 1115, then layers these together and sends the completed virtual map tile to the rendering controller 1175. The rendering controller 1175 stitches together the returned tiles from all of its tile providers (e.g., a virtual map tile and a virtual building tile) and sends this scene to the rendering engine 1125. The rendering engine 1125 uses the information in the map tiles to draw the scene for display.

Figure 12:
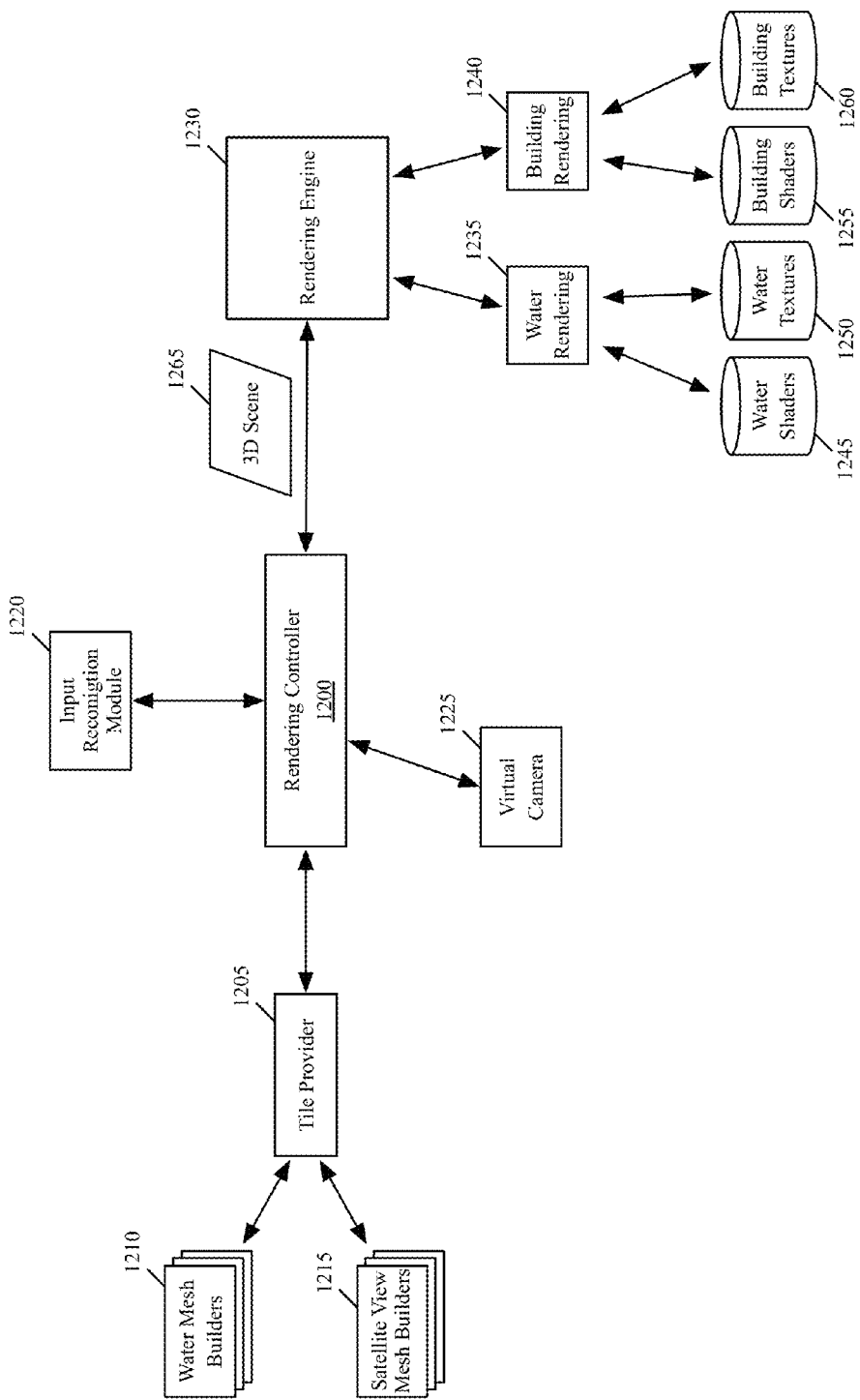
FIG. 12 conceptually illustrates a rendering controller that manages the rendering of animated water and buildings in 3D satellite map views according to some embodiments of the inventions.

FIG. 12 conceptually illustrates a rendering controller 1200 that manages the rendering of animated water and buildings in 3D satellite map views according to some embodiments of the inventions. In some embodiments, the rendering controller 1200 is similar to the one described above by reference to FIG. 11. In this example, a virtual camera 1225 identifies a 3D view of a map region and provides the 3D view to the rendering controller 1200.

When the rendering controller 1200 receives the 3D map view from the virtual camera 1225 to render, the rendering controller 1200 instantiates a tile provider 1205. The tile provider 1205 instantiates a set of water mesh builders 1210 and a set of satellite view mesh builders 1215 for building the virtual map tiles for a 3D scene 1265. The set of water mesh builders 1210 requests vector tiles for the 3D scene 1265 that include polygon data for water meshes (and meshes of other defined types of map elements and/or constructs) in the 3D scene 1265. The set of satellite view mesh builders 1215 requests satellite map tiles that include meshes and CCIs of the 3D scene 1265. In some embodiments, the rendering controller 1200 instantiates a tile provider for each different type of tiles needed for building the virtual map tiles for the 3D scene 12645. In this example, the rendering controller 1200 of some such embodiments instantiates a tile provider for the satellite map tiles and a tile provider for the vector tiles.

Once the rendering controller 1200 receives these virtual tiles from the tile provider 1205, the rendering controller 1200 pieces them together to form the 3D scene 1265 and provides the 3D scene 1265 to a rendering engine 1230 for rendering a 3D satellite map view of the 3D scene 1265 based on the 3D view identified by the virtual camera 1225.

For animating water and buildings in the 3D satellite map view, the rendering controller 1200 specifies the shaders and textures that the rendering engine 1230 uses to render the water meshes and the building meshes in the 3D scene 1265. The rendering controller 1200 specifies different shaders and/or textures based on different input information (e.g., touch input information, audio input information, motion input information, etc.) received from an input recognition module 1220. In some embodiments, the input recognition module 1220 is similar to the one described above by reference to FIG. 8. In some embodiments, the rendering controller 1200 specifies the same shader for animating a defined type of map element or construct based on a set of different inputs received from the input recognition module 1220. For instance, the rendering controller 1200 of some such embodiments specifies a shader for animating water waves to generate animations of water based on gesture input, audio input, and motion input.

The rendering engine 1230 renders the 3D satellite map view of the 3D scene 1265 using different sub-processes for rendering different map elements and/or constructs in the 3D satellite map view. In this example, a water rendering process 1235 renders bodies of water in the 3D satellite map view using water shaders and water textures and a building rendering process 1240 renders buildings in the 3D satellite map view using on building shaders and building textures. While the rendering processes 1235 and 1240 are shown as separate from the rendering engine 1230, the rendering processes 1235 and 1240 of some embodiments are actually part of the rendering engine 1230.

FIG. 13 conceptually illustrates a rendering engine 1300 that renders buildings for animated 3D satellite map views according to some embodiments of the invention. In some embodiments, the rendering engine 1300 implements the rendering engines described above by reference to FIGS. 11 and 12.

As shown, a scene rendering manager 1310 for handling the rendering map views receives a 3D scene 1305 for rendering a 3D satellite map view. To render the 3D satellite map view of the 3D scene 1305, the scene rendering manager 1310 manages the rendering of the meshes in the 3D scene and generates the 3D satellite map view of the rendered 3D scene 1305 once the meshes have been rendered. The scene rendering manager 1310 then stores the 3D satellite map view in a rendered map views storage 1335 for display on a display screen of a device on which the rendering engine 1300 operates.

As illustrated in FIG. 13, the scene rendering manager 1310 identifies a mesh 1315 in the 3D scene 1305 and passes it to a mesh identifier 1320 for identifying the mesh type of meshes. In this example, the mesh identifier 1320 identifies the mesh 1315 as a building mesh 1325 and passes it to a building mesh rendering process 1330 for rendering building meshes. The building mesh rendering process 1330 renders the building mesh 1325 using a building shader for animating the building mesh 1325 (e.g., a shader for animating reflections on the surfaces of the building mesh) and textures (e.g., CCIs, user or machine generated textures, and/or other types of textures) specified for rendering the building mesh 1325 and then returns the rendered building mesh 1325 to the scene rendering manager 1310.

In some embodiments, the building shader renders a building mesh based on the normals of the surfaces of the building mesh. For instance, the building shader of some embodiments uses the normals of the surfaces of the building mesh to render reflections and/or refractions on the surfaces of the building (e.g., the reflections on the buildings 705 and 710 illustrated in FIG. 7). In some embodiments, the building shader uses global illumination techniques to render these nearby reflections and refractions on the surfaces of the building. For a particular surface of a building, the building shader of some such embodiments takes into account light sources (e.g., the body of water and shoreline 715 illustrated in FIG. 7) as well as light rays that reflect off other reflective surfaces in the scene when rendering the reflections and/or refractions on the particular surface of the building.

FIG. 14 conceptually illustrates the rendering engine 1300 that renders water for animated 3D satellite map views according to some embodiments of the invention. In this example, the scene rendering manager 1310 is rendering the 3D scene 1305 in order to generate the 3D satellite map view of the 3D scene 1305.

As illustrated in FIG. 14, the scene rendering manager 1310 identifies a mesh 1415 in the 3D scene 1305 and passes it to the mesh identifier 1320. The mesh identifier 1320 in this example identifies the mesh 1415 as a water mesh 1425 and passes it to a water mesh rendering process 1430 for rendering water meshes. The water mesh rendering process 1430 renders the water mesh 1425 using a water shader for animating the water mesh 1425 (e.g., a shader for animating still water, a shader for animating water waves, a shader for animating water ripples, etc.) and textures (e.g., CCIs, user or machine generated textures, and/or other types of textures) specified for rendering the water mesh 1425 and then returns the rendered water mesh 1425 to the scene rendering manager 1310. In some embodiments, the water shader ignores the normals of the water mesh 1425 when the water shader is used to render the water mesh 1425. The water shader of some embodiments that is used to animate still water (e.g., the animated water illustrated in FIG. 1) is a texture shader that animates still water using a water texture.

Figure 15:
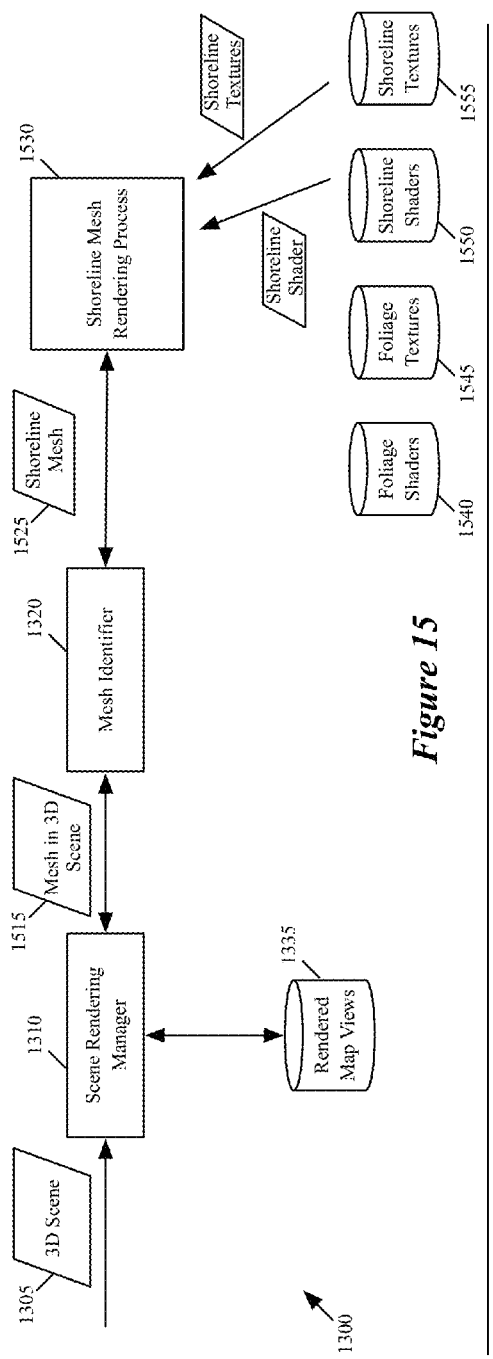
FIG. 15 conceptually illustrates the rendering engine illustrated in FIG. 13 that renders shorelines for animated 3D satellite map views according to some embodiments of the invention.

FIG. 15 conceptually illustrates the rendering engine 1300 that renders shorelines for animated 3D satellite map views according to some embodiments of the invention. For this example, the scene rendering manager 1310 is rendering the 3D scene 1305 in order to generate the 3D satellite map view of the 3D scene 1305.

As illustrated in FIG. 15, the scene rendering manager 1310 identifies a mesh 1515 in the 3D scene 1305 and passes it to the mesh identifier 1320. The mesh identifier 1320 in this example identifies the mesh 1515 as a shoreline mesh 1525 and passes it to a shoreline mesh rendering process 1530 for rendering shoreline meshes. The shoreline mesh rendering process 1530 renders the shoreline mesh 1525 using a shoreline shader for animating the shoreline mesh 1525 (e.g., a shader for animating waves along the shoreline mesh) and textures (e.g., CCIs, user or machine generated textures, and/or other types of textures) specified for rendering the shoreline mesh 1525 and then returns the rendered shoreline mesh 1525 to the scene rendering manager 1310. In some embodiments, the shoreline shader ignores the normals of the shoreline mesh 1525 when the shoreline shader is used to render the shoreline mesh 1525.

Figure 16:
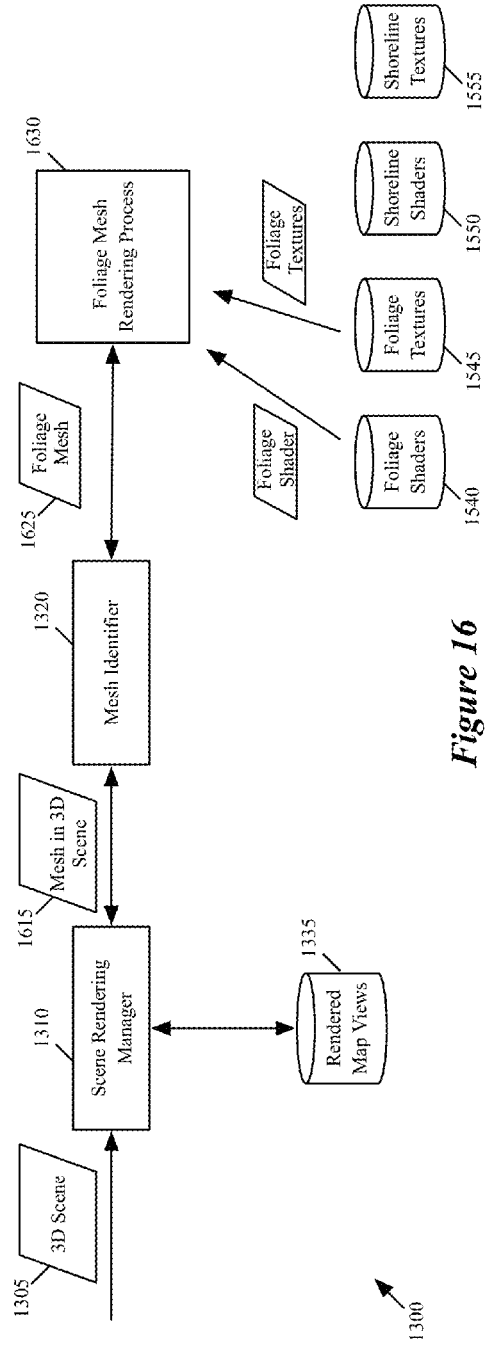
FIG. 16 conceptually illustrates the rendering engine illustrated in FIG. 13 that renders foliage for animated 3D satellite map views according to some embodiments of the invention.

FIG. 16 conceptually illustrates the rendering engine 1300 that renders foliage for animated 3D satellite map views according to some embodiments of the invention. In this example, the scene rendering manager 1310 is rendering the 3D scene 1305 in order to generate the 3D satellite map view of the 3D scene 1305.

As illustrated in FIG. 16, the scene rendering manager 1310 identifies a mesh 1615 in the 3D scene 1305 and passes it to the mesh identifier 1320. The mesh identifier 1320 in this example identifies the mesh 1615 as a foliage mesh 1625 and passes it to a foliage mesh rendering process 1630 for rendering foliage meshes. The foliage mesh rendering process 1630 renders the foliage mesh 1625 using a foliage shader for animating the foliage mesh 1625 (e.g., a shader for animating still foliage, a shader for animating swaying foliage, etc.) and textures (e.g., CCIs, user or machine generated textures, and/or other types of textures) specified for rendering the foliage mesh 1625 and then returns the rendered foliage mesh 1625 to the scene rendering manager 1310. In some embodiments, the foliage shader ignores the normals of the foliage mesh 1625 when the foliage shader is used to render the foliage mesh 1625. The foliage shader of some embodiments is a texture shader that animates still foliage using a foliage texture. In some embodiments, the shader that is used to animate still water is also used to animate still foliage.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 17:
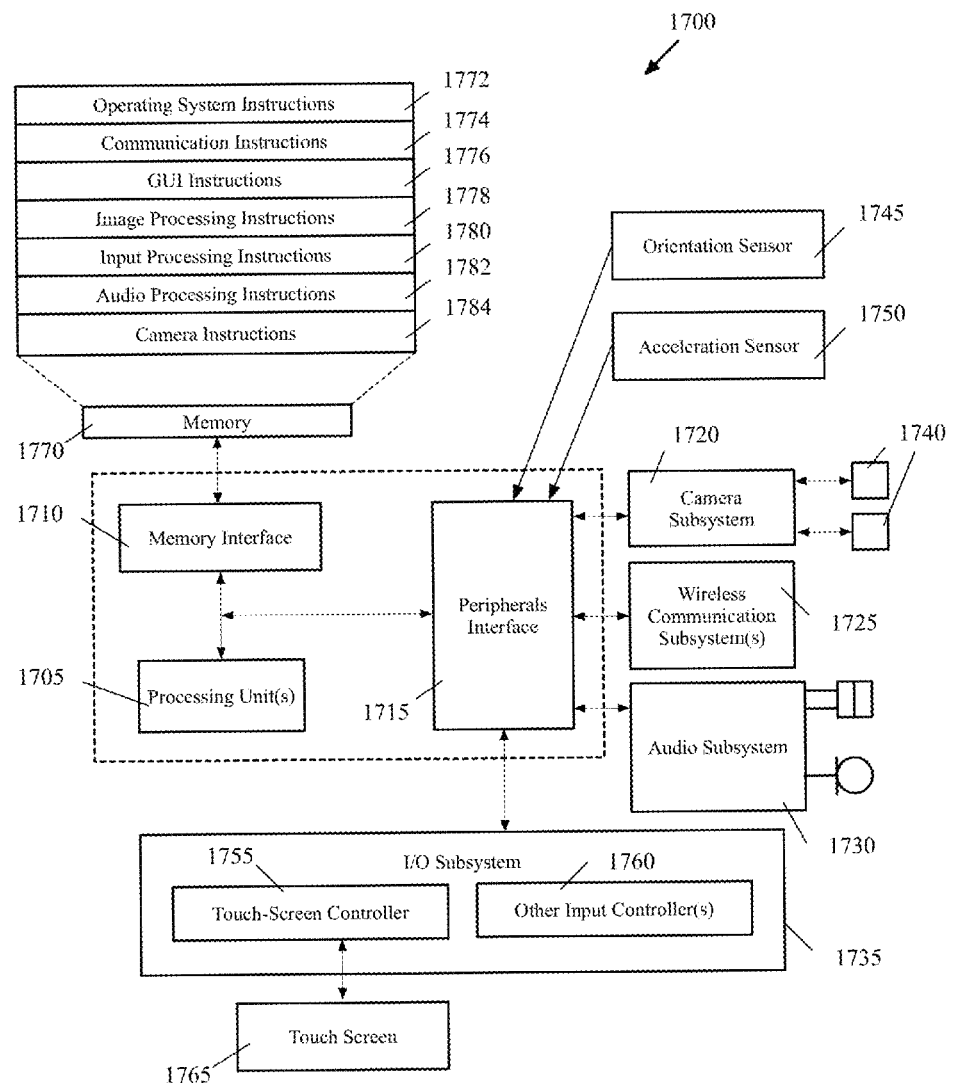
FIG. 17 is an example of an architecture of a mobile computing device.

The mapping application of some embodiments operate on mobile devices, such as smart phones (e.g., iPhones®) and tablets (e.g., iPads®). FIG. 17 is an example of an architecture 1700 of such a mobile computing device. Examples of mobile computing devices include smartphones, tablets, laptops, etc. As shown, the mobile computing device 1700 includes one or more processing units 1705, a memory interface 1710 and a peripherals interface 1715.

The peripherals interface 1715 is coupled to various sensors and subsystems, including a camera subsystem 1720, a wireless communication subsystem(s) 1725, an audio subsystem 1730, an I/O subsystem 1735, etc. The peripherals interface 1715 enables communication between the processing units 1705 and various peripherals. For example, an orientation sensor 1745 (e.g., a gyroscope) and an acceleration sensor 1750 (e.g., an accelerometer) is coupled to the peripherals interface 1715 to facilitate orientation and acceleration functions.

The camera subsystem 1720 is coupled to one or more optical sensors 1740 (e.g., a charged coupled device (CCD) optical sensor, a complementary metal-oxide-semiconductor (CMOS) optical sensor, etc.). The camera subsystem 1720 coupled with the optical sensors 1740 facilitates camera functions, such as image and/or video data capturing. The wireless communication subsystem 1725 serves to facilitate communication functions. In some embodiments, the wireless communication subsystem 1725 includes radio frequency receivers and transmitters, and optical receivers and transmitters (not shown in FIG. 17). These receivers and transmitters of some embodiments are implemented to operate over one or more communication networks such as a GSM network, a Wi-Fi network, a Bluetooth network, etc. The audio subsystem 1730 is coupled to a speaker to output audio (e.g., to output voice navigation instructions). Additionally, the audio subsystem 1730 is coupled to a microphone to facilitate voice-enabled functions, such as voice recognition (e.g., for searching), digital recording, etc.

The I/O subsystem 1735 involves the transfer between input/output peripheral devices, such as a display, a touchscreen, etc., and the data bus of the processing units 1705 through the peripherals interface 1715. The I/O subsystem 1735 includes a touchscreen controller 1755 and other input controllers 1760 to facilitate the transfer between input/output peripheral devices and the data bus of the processing units 1705. As shown, the touchscreen controller 1755 is coupled to a touchscreen 1765. The touchscreen controller 1755 detects contact and movement on the touchscreen 1765 using any of multiple touch sensitivity technologies. The other input controllers 1760 are coupled to other input/control devices, such as one or more buttons. Some embodiments include a near-touch sensitive screen and a corresponding controller that can detect near-touch interactions instead of or in addition to touch interactions.

The memory interface 1710 is coupled to memory 1770. In some embodiments, the memory 1770 includes volatile memory (e.g., high-speed random access memory), non-volatile memory (e.g., flash memory), a combination of volatile and non-volatile memory, and/or any other type of memory. As illustrated in FIG. 17, the memory 1770 stores an operating system (OS) 1772. The OS 1772 includes instructions for handling basic system services and for performing hardware dependent tasks.

The memory 1770 also includes communication instructions 1774 to facilitate communicating with one or more additional devices; graphical user interface instructions 1776 to facilitate graphic user interface processing; image processing instructions 1778 to facilitate image-related processing and functions; input processing instructions 1780 to facilitate input-related (e.g., touch input) processes and functions; audio processing instructions 1782 to facilitate audio-related processes and functions; and camera instructions 1784 to facilitate camera-related processes and functions. The instructions described above are merely exemplary and the memory 1770 includes additional and/or other instructions in some embodiments. For instance, the memory for a smartphone may include phone instructions to facilitate phone-related processes and functions. Additionally, the memory may include instructions for a mapping application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 17 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 17 may be split into two or more integrated circuits.

B. Computer System

Figure 18:
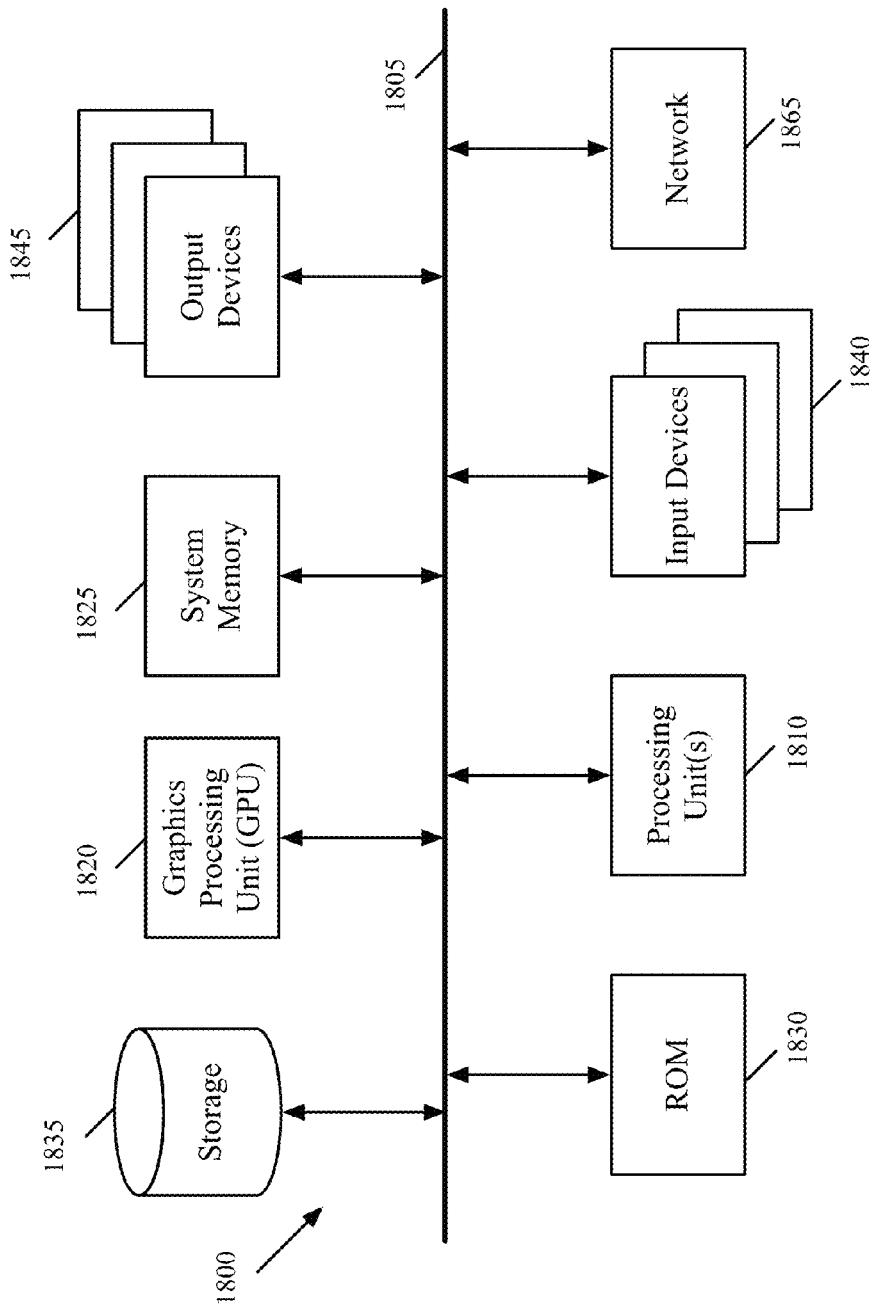
FIG. 18 conceptually illustrates an example of an electronic system with which some embodiments of the invention are implemented.

FIG. 18 conceptually illustrates another example of an electronic system 1800 with which some embodiments of the invention are implemented. The electronic system 1800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1800 includes a bus 1805, processing unit(s) 1810, a graphics processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the GPU 1815, the system memory 1820, and the permanent storage device 1835.

From these various memory units, the processing unit(s) 1810 retrieves instructions to execute and data to process in order to execute the processes of the invention. The processing unit(s) may be a single processor or a multi-core processor in different embodiments. Some instructions are passed to and executed by the GPU 1815. The GPU 1815 can offload various computations or complement the image processing provided by the processing unit(s) 1810. In some embodiments, such functionality can be provided using CoreImage's kernel shading language.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive, integrated flash memory) as the permanent storage device 1835.

Other embodiments use a removable storage device (such as a floppy disk, flash memory device, etc., and its corresponding drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor needs at runtime. In some embodiments, the invention's processes are stored in the system memory 1820, the permanent storage device 1835, and/or the read-only memory 1830. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

IV. Map Service Environment

Figure 19:
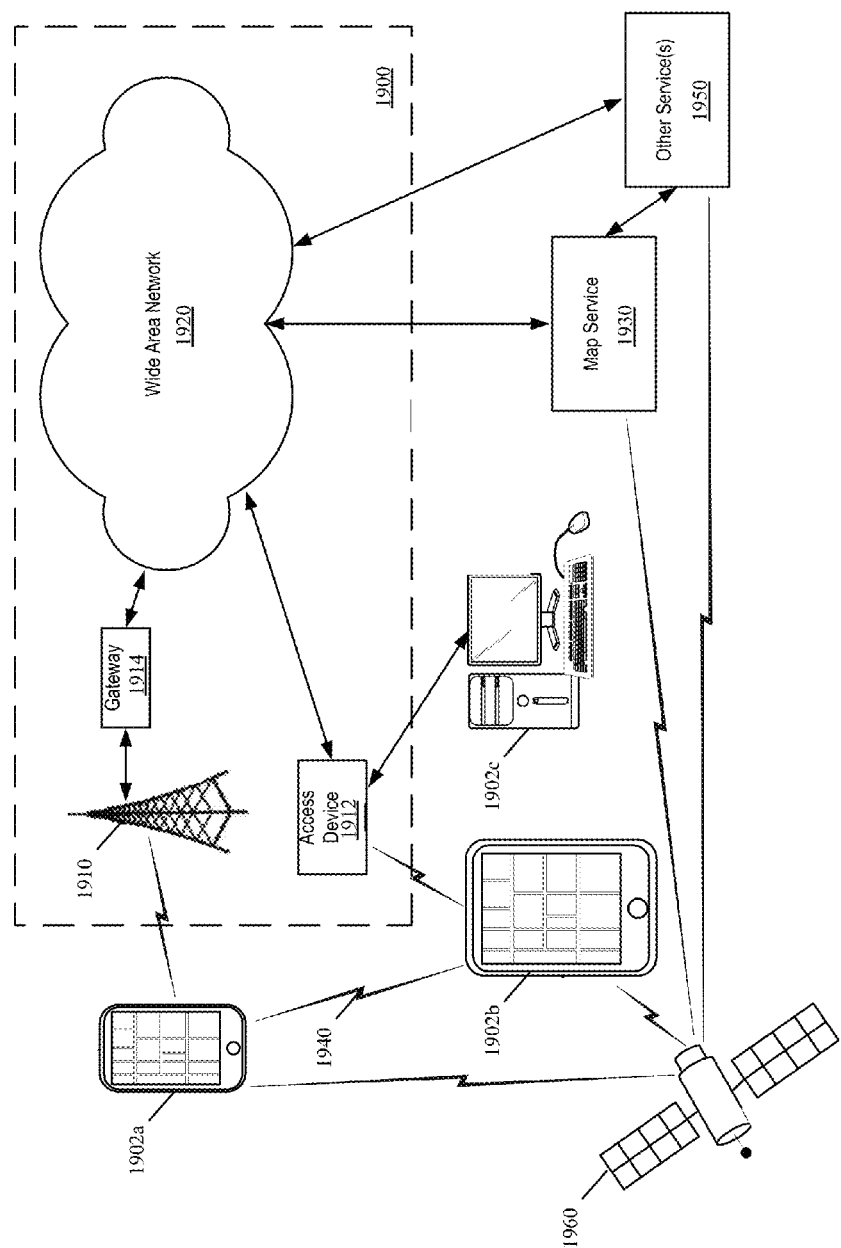
FIG. 19 a map service operating environment according to some embodiments.

Various embodiments may operate within a map service operating environment. FIG. 19 illustrates a map service operating environment, according to some embodiments. A map service 1930 (also referred to as mapping service) may provide map services for one or more client devices 1902*a*-1902*c* in communication with the map service 1930 through various communication methods and protocols. A map service 1930 in some embodiments provides map information and other map-related data, such as two-dimensional map image data (e.g., aerial view of roads utilizing CCIs), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 1902a-1902c may utilize these map services by obtaining map service data. Client devices 1902a-1902c may implement various techniques to process map service data. Client devices 1902a-1902c may then provide map services to various entities, including, but not limited to, users, internal software or hardware modules, and/or other systems or devices external to the client devices 1902a-1902c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wired or wireless network type).

A map service may obtain map service data from internal or external sources. For example, CCIs used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1902a-1902c) are implemented on different portable-multi-function device types. Client devices 1902a-1902c utilize map service 1930 through various communication methods and protocols. In some embodiments, client devices 1902a-1902c obtain map service data from map service 1930. Client devices 1902a-1902c request or receive map service data.

Client devices 1902a-1902c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS) system. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow the virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wired or wireless network type).

FIG. 19 illustrates one possible embodiment of an operating environment 1900 for a map service 1930 and client devices 1902a-1902c. In some embodiments, devices 1902a, 1902b, and 1902c communicate over one or more wired or wireless networks 1910. For example, wireless network 1910, such as a cellular network, can communicate with a wide area network (WAN) 1920, such as the Internet, by use of gateway 1914. A gateway 1914 in some embodiments provides a packet oriented mobile data service, such as General Packet Radio Service (GPRS), or other mobile data service allowing wireless networks to transmit data to other networks, such as wide area network 1920. Likewise, access device 1912 (e.g., IEEE 802.11g wireless access device) provides communication access to WAN 1920. Devices 1902a and 1902b can be any portable electronic or computing device capable of communicating with a map service. Device 1902c can be any non-portable electronic or computing device capable of communicating with a map service.

In some embodiments, both voice and data communications are established over wireless network 1910 and access device 1912. For instance, device 1902a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1910, gateway 1914, and WAN 1920 (e.g., using Transmission Control Protocol/Internet Protocol (TCP/IP) or User Datagram Protocol (UDP)). Likewise, in some implementations, devices 1902b and 1902c can place and receive phone calls, send and receive e-mail messages, and retrieve electronic documents over access device 1912 and WAN 1920. In various embodiments, any of the illustrated client devices may communicate with map service 1930 and/or other service(s) 1950 using a persistent connection established in accordance with one or more security protocols, such as the Secure Sockets Layer (SSL) protocol or the Transport Layer Security (TLS) protocol.

Devices 1902a and 1902b can also establish communications by other means. For example, wireless device 1902a can communicate with other wireless devices (e.g., other devices 1902b, cell phones, etc.) over the wireless network 1910. Likewise devices 1902a and 1902b can establish peer-to-peer communications 1940 (e.g., a personal area network) by use of one or more communication subsystems, such as Bluetooth® communication from Bluetooth Special Interest Group, Inc. of Kirkland, Wash. Device 1902c can also establish peer to peer communications with devices 1902a or 1902b (not shown). Other communication protocols and topologies can also be implemented. Devices 1902a and 1902b may also receive Global Positioning Satellite (GPS) signals from GPS satellites 1960.

Devices 1902a, 1902b, and 1902c can communicate with map service 1930 over one or more wire and/or wireless networks, 1910 or 1912. For instance, map service 1930 can provide map service data to rendering devices 1902a, 1902b, and 1902c. Map service 1930 may also communicate with other services 1950 to obtain data to implement map services. Map service 1930 and other services 1950 may also receive GPS signals from GPS satellites 1960.

In various embodiments, map service 1930 and/or other service(s) 1950 are configured to process search requests from any of the client devices. Search requests may include but are not limited to queries for businesses, addresses, residential locations, points of interest, or some combination thereof. Map service 1930 and/or other service(s) 1950 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1930 and/or other service(s) 1950 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1930 and/or other service(s) 1950, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1930 and/or other service(s) 1950 provide one or more feedback mechanisms to receive feedback from client devices 1902a-1902c. For instance, client devices may provide feedback on search results to map service 1930 and/or other service(s) 1950 (e.g., feedback specifying ratings, reviews, temporary or permanent business closures, errors etc.); this feedback may be used to update information about points of interest in order to provide more accurate or more up-to-date search results in the future. In some embodiments, map service 1930 and/or other service(s) 1950 may provide testing information to the client device (e.g., an A/B test) to determine which search results are best. For instance, at random intervals, the client device may receive and present two search results to a user and allow the user to indicate the best result. The client device may report the test results to map service 1930 and/or other service(s) 1950 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. In addition, FIG. 9 conceptually illustrate a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine-readable medium of a device storing a mapping application for generating views of a three-dimensional (3D) map, the mapping application comprising:
   a geographic data module for defining a plurality of geographic objects in a portion of the 3D map, the geographic objects comprising a set geographic objects that are textured by a set of camera captured images (CCI) of a portion of the world that corresponds to the portion of the 3D map;
   an input module for receiving an input; and
   an image processing module for rendering the view of the 3D map portion based on the plurality of defined geographic objects by animating, in response to the input, at least a first geographic object to appear to move with respect to at least a second geographic object.

2. The non-transitory machine-readable medium of claim 1, wherein the first geographic object is a CCI-textured geographic object of the set of geographic objects in the portion of the 3D map.

3. The non-transitory machine-readable medium of claim 1, wherein the image processing module renders the view of the 3D map portion based on the plurality of defined geographic objects by mapping the plurality of geographic objects to the portion of the 3D map.

4. The non-transitory machine-readable medium of claim 1, wherein the image processing module animates the first geographic object by applying a shader to the first geographic object.

5. The non-transitory machine-readable medium of claim 4, wherein the shader is a texture shader.

6. The non-transitory machine-readable medium of claim 1, wherein the geographic data module defines the plurality of geographic objects by accessing a map service that provides map data.

7. The non-transitory machine-readable medium of claim 1, wherein the first geographic object comprises a body of water.

8. The non-transitory machine-readable medium of claim 1, wherein the device comprises a set of motion sensors, wherein the input module receives different types of input through different motion sensors of the set.

9. The non-transitory machine-readable medium of claim 8, wherein the image processing module renders the view of the 3D map portion further based on a type of received input.

10. The non-transitory machine-readable medium of claim 8, wherein the image processing module animates the first geographic object by applying different shaders to the first geographic object based on different types of received input.

11. The non-transitory machine readable medium of claim 1, wherein the first geographic object is a none-CCI-textured geographic object in the plurality of geographic objects.

12. The non-transitory machine readable medium of claim 1, wherein the first and second geographic objects are CCI-textured geographic objects in the set of geographic objects.

13. A non-transitory machine-readable medium storing a mapping application for execution by at least one processing unit of a device, the mapping application comprising sets of instructions for:

displaying a first selectable user interface (UI) control for identifying a portion of a three-dimensional (3D) presentation of a map for display, said portion comprising a set of objects that are textured by a set of camera captured images (CCI) of a portion of the world that corresponds to the portion of the 3D map; and displaying a second selectable UI control for directing the mapping application to render a presentation of the portion of the map, by animating at least a first object to appear to move with respect to at least a second object, wherein the first object is defined by reference to a plurality of vertices in a mesh that is used to define objects for rendering, wherein the mapping application animates moving one set of the vertices used to define the first object while not moving another set of vertices used to define the first object.

14. The non-transitory machine-readable medium of claim 13, wherein the device includes an input sensor, wherein the mapping application further comprises a set of instructions for receiving an input through the input sensor, wherein the set of instructions for animating the first object comprises a set of instructions for animating the first object based on the received input.

15. The non-transitory machine-readable medium of claim 13, wherein the first object comprises a tree and the second object comprises a building.

16. The non-transitory machine-readable medium of claim 14, wherein the input sensor is an audio sensor.

17. The non-transitory machine-readable medium of claim 14, wherein the input sensor is a motion sensor.

18. The non-transitory machine-readable medium of claim 14, wherein the input sensor is a touch sensor.

19. For a mapping application, a method, performed by a computer, of generating views of a map, the method comprising:

receiving a request to render a three-dimensional (3D) view of the map based on a set of camera captured images corresponding to the 3D view of the map;

identifying map elements of a defined type in the 3D view of the map; and rendering the 3D view of the map using a set of shaders specified for animating map elements of the defined type.

20. The method of claim 19, wherein the map elements of the defined type comprises bodies of water.

21. The method of claim 20, wherein the set of shaders animates the bodies of water by ignoring surface normals of polygons that represent the bodies of water.

22. The method of claim 19, wherein the map elements of the defined type comprises buildings.

23. The method of claim 22, wherein the set of shaders animates the buildings based on surface normals of polygons that represent the buildings.

* * * * *